(12) United States Patent
Seki

(10) Patent No.: US 8,928,782 B2
(45) Date of Patent: Jan. 6, 2015

(54) IMAGE PROCESSING DEVICE AND IMAGE CAPTURE DEVICE

(71) Applicant: Fujitsu Semiconductor Limited, Yokohama, Kanagawa (JP)

(72) Inventor: Takeshi Seki, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 0 days.

(21) Appl. No.: 14/057,752

(22) Filed: Oct. 18, 2013

(65) Prior Publication Data

US 2014/0111672 A1   Apr. 24, 2014

(30) Foreign Application Priority Data

Oct. 23, 2012   (JP) .................................. 2012-233686

(51) Int. Cl.
*H04N 5/217* (2011.01)
*H04N 9/64* (2006.01)

(52) U.S. Cl.
CPC .............. *H04N 9/646* (2013.01); *H04N 5/217* (2013.01)
USPC .......................................... 348/241; 348/251

(58) Field of Classification Search
USPC ................................. 348/241, 251
See application file for complete search history.

(56) References Cited

U.S. PATENT DOCUMENTS

| 7,636,498 B2 | 12/2009 | Furukawa et al. |
| 8,058,963 B2 | 11/2011 | Yasuda et al. |
| 2008/0129846 A1* | 6/2008 | Azuma .......................... 348/241 |
| 2008/0218604 A1* | 9/2008 | Shikano et al. ............ 348/240.3 |

FOREIGN PATENT DOCUMENTS

| JP | 2004-362069 A | 12/2004 |
| JP | 2005-020087 A | 1/2005 |
| JP | 2008-065722 A | 3/2008 |
| JP | 2009-177651 A | 8/2009 |
| JP | 2010-027758 A | 2/2010 |
| JP | 2010-028758 A | 2/2010 |
| JP | 2010257357 A | * 11/2010 ............. H04N 5/232 |

* cited by examiner

*Primary Examiner* — Anthony J Daniels
(74) *Attorney, Agent, or Firm* — Arent Fox LLP

(57) ABSTRACT

A first distortion correction unit generates one first output pixel based on two input pixels that are adjacent in a first direction out of a plurality of input pixels included in image data pieces of a captured frame. A second distortion correction unit generates one second output pixel based on two first output pixels that are adjacent in a second direction different from the first direction. The second distortion correction unit successively reads two first output pixels adjacent in the second direction from a storage unit based on input coordinates, which correspond to coordinate values of second output pixels, and generates the one second output pixel by applying linear interpolation processing to the read two first output pixels based on interpolation coefficient.

10 Claims, 21 Drawing Sheets

IMAGE PROCESSING DEVICE AND IMAGE CAPTURE DEVICE

CROSS-REFERENCE TO RELATED APPLICATIONS

This application is based upon and claims the benefit of priority from prior Japanese Patent Application No. 2012-233686, filed on Oct. 23, 2012, the entire contents of which are incorporated herein by reference.

FIELD

The present invention relates to an image processing device and an image capture device.

BACKGROUND

The aberration of an optical system, such as a lens, may cause a geometric distortion in a captured image. In view of this, image capture devices capable of recording digital data of a captured image, such as digital still cameras and digital video cameras, include a distortion correction unit that applies distortion correction processing to image data stored in a memory (see, for example, Japanese Patent Laid-Open Publication No. 2010-28758).

SUMMARY

An image capture device includes a plurality of processing units for color conversion processing and the like. These processing units, as well as a distortion correction unit, access a memory to obtain image data necessary for processing, and to record processed image data. Therefore, in the image capture device, the number of times the memory is accessed is significantly large. In general, the larger the number of pixels in one frame, the larger the number of times the memory is accessed. An increase in the number of times the memory is accessed extends a wait time period required for the processing units and the distortion correction unit to access the memory, and extends a time period required to process image data of one frame.

According to an aspect of the invention, an image processing device for use with a memory is provided. The device includes a first distortion correction unit that generates one first output pixel based on two input pixels that are adjacent in a first direction out of a plurality of input pixels included in image data pieces of a captured frame; and a second distortion correction unit that generates one second output pixel based on two first output pixels that are adjacent in a second direction different from the first direction, and stores the second output pixel into the memory. The second distortion correction unit divides an image of the frame into a plurality of grid blocks, and generates input coordinates and an interpolation coefficient corresponding to a coordinate value of the second output pixel based on grid block coordinates of a plurality of vertexes of the grid blocks, stores a plurality of division lines into a storage unit, the plurality of division lines having a size corresponding to a transfer amount for a single access to the memory, including a plurality of first output pixels that are consecutive in the first direction, and being based on coordinate values of the plurality of first output pixels corresponding to a plurality of second output pixels having a size corresponding to the transfer amount for the single access, successively reads two first output pixels adjacent in the second direction from the storage unit based on the input coordinates, which correspond to coordinate values of the plurality of second output pixels, and generates the one second output pixel by applying linear interpolation processing to the read two first output pixels based on the interpolation coefficient.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

DESCRIPTION OF EMBODIMENTS

Figure 1:
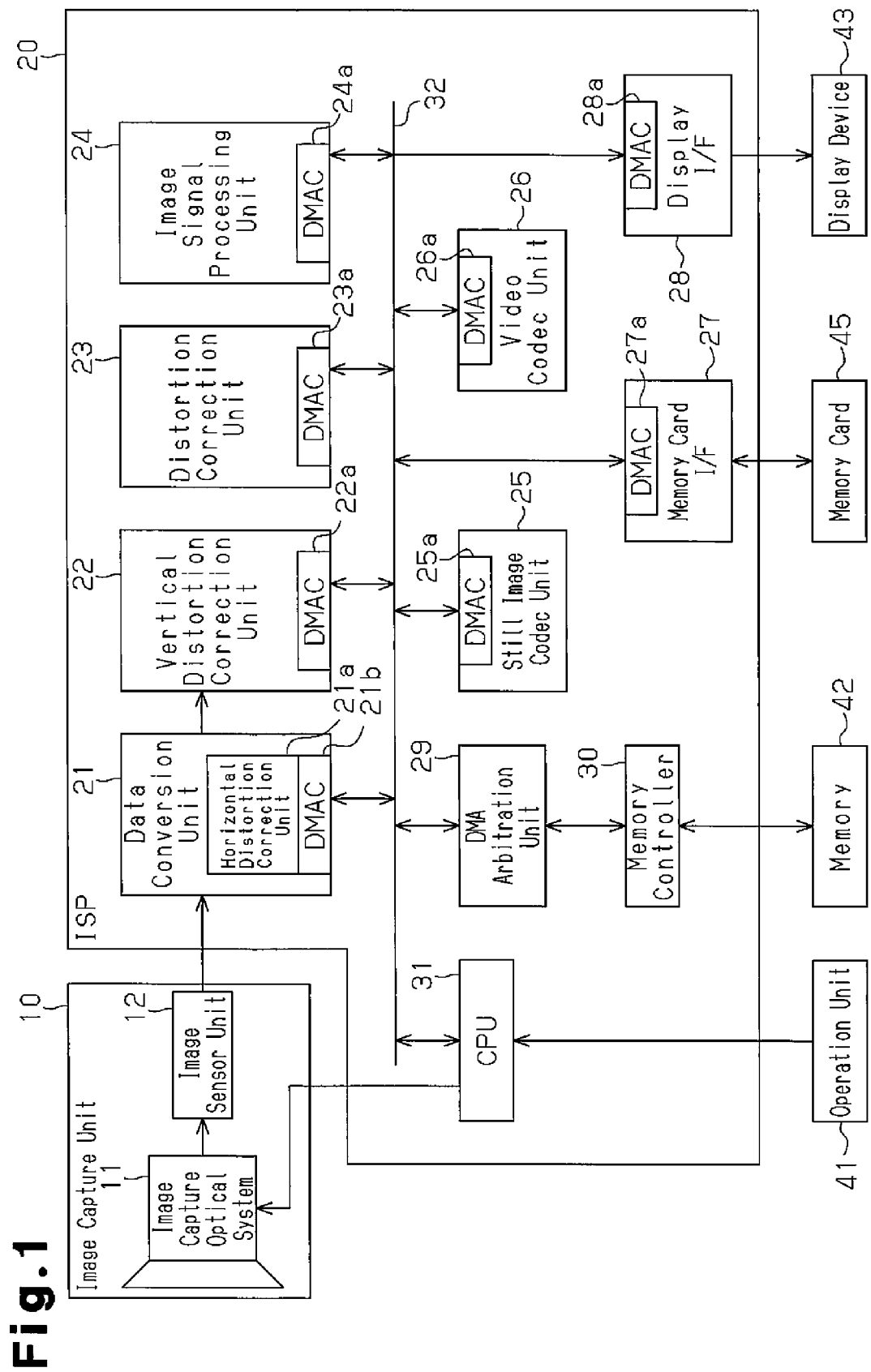
FIG. 1 is a schematic block diagram illustrating an image capture device according to a first embodiment.

The following describes a first embodiment with reference to FIGS. 1 to 12B. FIG. 1 illustrates an image capture device, which may be a digital still camera. This image capture device includes an image capture unit 10, an image signal processor (ISP) 20, an operation unit 41, a memory 42, and a display device 43. The image capture unit 10 outputs image data corresponding to incident light from a subject. The image signal processor 20 applies various types of image processing to the image data output from the image capture unit 10 in accordance with default setting values or setting values set by the operation unit 41. The image signal processor 20 stores, into the memory 42, image data in process or processed image data. The image signal processor 20 displays image data output from the image capture unit 10 or image data stored in the memory 42 on the display device 43 as an image. The image signal processor 20 stores image data stored in the memory 42 into a memory card 45 in accordance with, for example, an operation of the operation unit 41.

The image capture unit 10 includes an image capture optical system 11 and an image sensor unit 12.

The image capture optical system 11 includes a lens that focuses incident light from the subject (e.g., a focus lens), a diaphragm for adjusting the amount of light that has passed through that lens, and the like. The image capture unit 10 directs an optical image of the subject to the image sensor unit 12. The image sensor unit 12 includes, for example, color filters of the Bayer arrangement and an image sensor. The image sensor incorporates, for example, a CCD (charge-coupled device). The image sensor outputs an image capture signal (analog signal) corresponding to the amount of light incident through the color filters. The image sensor unit 12 converts the analog image capture signal into digital image capture data. The image sensor unit 12 outputs the converted image capture data in accordance with a synchronization signal. The synchronization signal includes a vertical synchronization signal indicating segmentation for one field, and a horizontal synchronization signal indicating segmentation for one line. The synchronization signal is supplied from, for example, the image signal processor 20.

The image signal processor 20 includes a data conversion unit 21, a vertical distortion correction unit 22, a distortion correction unit 23, an image signal processing unit 24, a still image codec unit 25, a video codec unit 26, a memory card interface (memory card I/F) 27, a display interface (display I/F) 28, a DMA arbitration unit 29, a memory controller 30, a CPU (control unit) 31, and an internal bus 32.

The DMA arbitration unit 29 is connected to the memory 42 via the memory controller 30. The memory 42 is one example of a storage unit. The memory 42 is, for example, a synchronous dynamic random-access memory (SDRAM). The data conversion unit 21 applies predetermined processing to image capture data output from the image capture unit 10, and stores the processed image data into the memory 42. The memory 42 stores image data processed by the processing units 22 to 26.

The data conversion unit 21 converts a data format of image capture data output from the image capture unit 10. Image capture data is, for example, image data of an RGB format (Bayer data). The data conversion unit 21 converts image capture data into, for example, data of a YCbCr format (Y denotes luma, and Cb, Cr denote color differences). Converted image data contains a plurality of pixel data pieces, and each pixel data piece contains luma information and color difference information.

The data conversion unit 21 includes a horizontal distortion correction unit 21*a* and an access control unit (noted as a direct memory access controller or DMAC) 21*b*. The horizontal distortion correction unit 21*a* is one example of a first distortion correction unit. With respect to image data of the YCbCr format, the horizontal distortion correction unit 21*a* corrects horizontal distortion out of distortions caused by the aberration of the image capture optical system 11. The access control unit 21*b* accesses the memory 42 via the DMA arbitration unit 29 and the memory controller 30, and stores, into the memory 42, image data to which distortion correction has been applied by the horizontal distortion correction unit 21*a*.

Figure 5A:
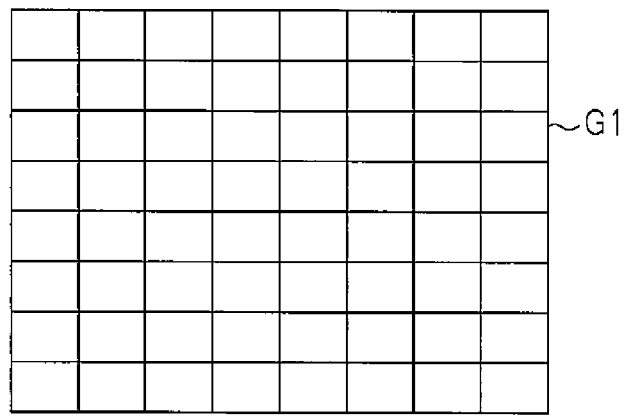
FIGS. 5A to 5C illustrate image distortion.
Figure 5B:
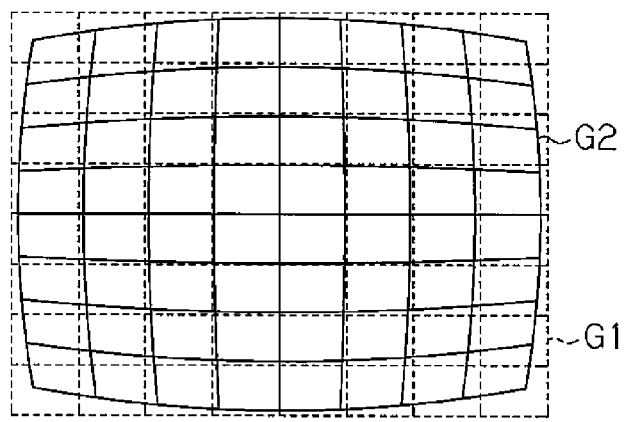
Figure 5C:
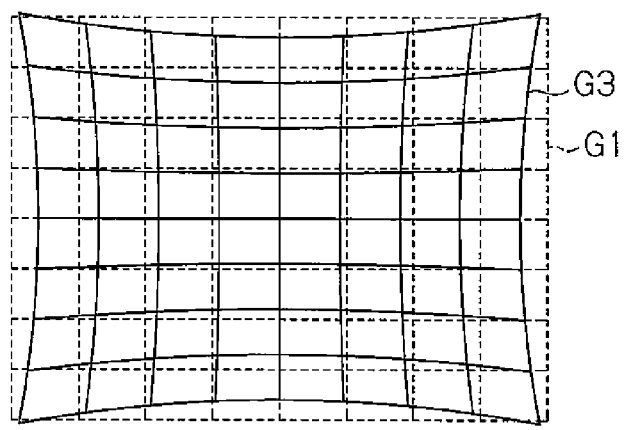

Image data output from the image capture unit 10 may contain image distortion attributed to the lens included in the image capture optical system 11 (e.g., distortion). For example, when the subject is a grid G1 illustrated in FIG. 5A, an image of the grid G1 may deform due to the characteristics of the lens (distortion). FIG. 5B illustrates an image of a grid G2 distorted into the shape of a barrel. FIG. 5C illustrates an image of a grid G3 distorted into the shape of a spool with concave edges. Such distorted grids are stored as image data. Referring to the examples of FIGS. 5A to 5C, the centers of the grids G1, G2, G3 match the center of image capture by the optical system in the image capture device. Dashed lines in FIGS. 5B and 5C indicate the original shape of the grid G1, namely the subject. With respect to image data of an image containing such distortion, the horizontal distortion correction unit 21*a* corrects horizontal distortion.

The vertical distortion correction unit 22 corrects vertical distortion out of distortions caused by the aberration of the image capture optical system 11. The vertical distortion correction unit 22 is one example of a second distortion correction unit and a first correction unit. The vertical distortion correction unit 22 includes an access control unit (DMAC) 22*a*. The access control unit 22*a* accesses the memory 42 via the DMA arbitration unit 29 and the memory controller 30, and reads image data necessary for the vertical distortion correction unit 22 from the memory 42. The vertical distortion correction unit 22 corrects vertical distortion in partial image data that the access control unit 22*a* has read from the memory 42. The access control unit 22*a* stores image data processed by the vertical distortion correction unit 22 into the memory 42.

The distortion correction unit 23 corrects horizontal distortion and vertical distortion caused by the image capture optical system 11. The distortion correction unit 23 includes an access control unit (DMAC) 23*a*. The access control unit 23*a* accesses the memory 42 via the DMA arbitration unit 29 and the memory controller 30, and reads image data necessary for the distortion correction unit 23 from the memory 42. The access control unit 23*a* stores image data corrected by the distortion correction unit 23 into the memory 42.

Figure 6A:
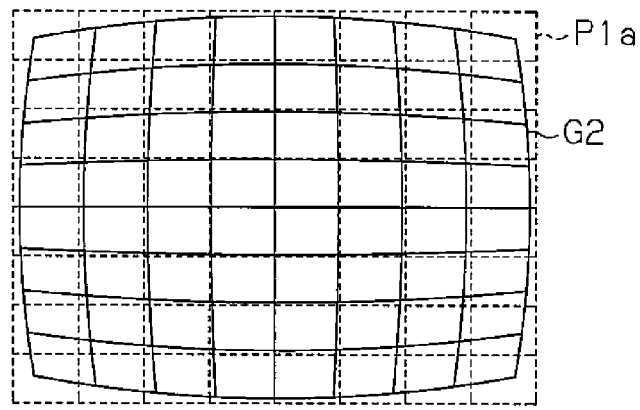
FIGS. 6A to 6C illustrate image distortion correction.
Figure 6B:
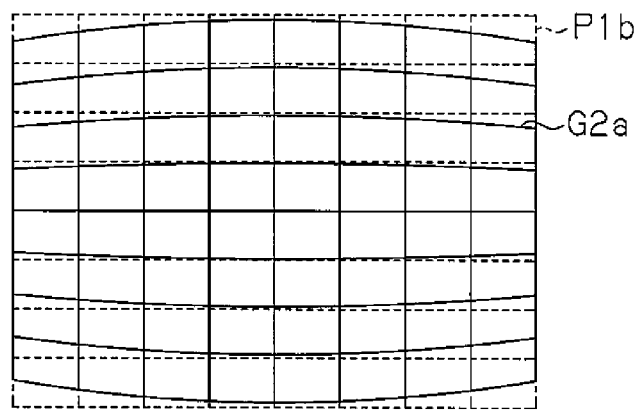
Figure 6C:
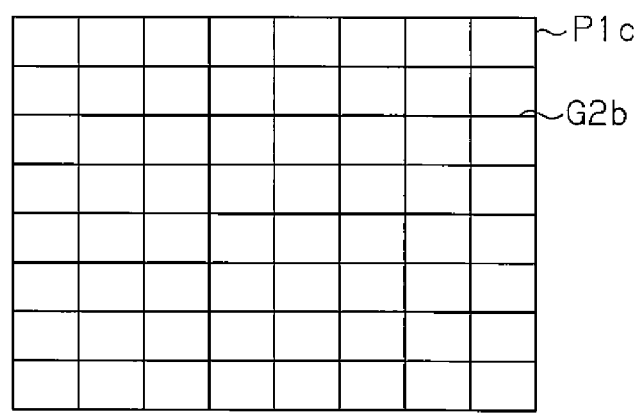

FIGS. 6A to 6C illustrate correction processing with respect to barrel-shaped distortion.

The horizontal distortion correction unit 21*a* generates image data P1*b* illustrated in FIG. 6B by applying horizontal distortion correction processing to image data P1*a* illustrated in FIG. 6A. As a result of the horizontal distortion correction processing, the length of the barrel-shaped grid G2 included in the image data P1*a* in the horizontal direction is matched to a predetermined value, and the curved lines of the grid G2 running in the vertical direction become vertical straight lines in a grid G2*a* included in the image data P1*b*. The vertical distortion correction unit 22 generates image data P1*c* illustrated in FIG. 6C by applying vertical distortion correction processing to the image data P1*b* illustrated in FIG. 6B. As a result of the vertical distortion correction processing, the length of the grid G2*a* included in the image data P1*b* in the vertical direction is matched to a predetermined value, and the curved lines of the grid G2*a* running in the horizontal direction become horizontal straight lines in a grid G2*b* included in image data P1*c*. By executing the aforementioned twophased distortion correction processing, the distortion correction unit 23 generates the image data P1c illustrated in FIG. 6C from the image data P1a illustrated in FIG. 6A. Consequently, the barrel-shaped grid G2 included in the image data P1a becomes the rectangular grid G2b in the image data P1c.

The image signal processing unit 24 may constitute one or more processing units. The image signal processing unit 24 includes an access control unit 24a that accesses the memory 42. Examples of processing executed by the image signal processing unit 24 include: color correction processing such as color tone modification; resolution conversion processing for increasing and decreasing the number of pixels; edge emphasis processing for emphasizing edges of an image; and noise removal processing for removing noise included in image data. The image signal processing unit 24 reads image data stored in the memory 42, applies image processing to the read image data, and stores processed image data into the memory 42.

The still image codec unit 25 includes an access control unit 25a that accesses the memory 42. The still image codec unit 25 reads still image data stored in the memory 42, codes the read image data using a predetermined method (e.g., a JPEG (Joint Photographic Experts Group) method), and stores the coded still image data into the memory 42.

The video codec unit 26 includes an access control unit 26a that accesses the memory 42. The video codec unit 26 reads video data stored in the memory 42, codes the read video data using a predetermined method (e.g., an MPEG (Moving Picture Experts Group) method), and stores the coded video data into the memory 42.

The above processing units 21 to 26 and processing thereof are illustrative. The types and processing of the processing units included in the image signal processor 20 may be changed as appropriate.

The memory card I/F 27 is connected to the memory card 45, which is attached to the image capture device. The memory card I/F 27 includes an access control unit 27a that accesses the memory 42. The memory card I/F 27 stores data stored in the memory 42 (e.g., compressed image data) into the memory card 45.

The display device 43 is connected to the display I/F 28. The display device 43 is, for example, an LCD (liquid crystal display) device. The display device 43 displays, for example, an image capture frame, a captured image, the remaining level of a battery, which is a drive source of the image capture device, and an image capture mode. The display I/F includes an access control unit 28a that accesses the memory 42. For example, the display I/F 28 reads image data stored in the memory 42, and supplies the read image data to the display device 43. The display device 43 may be changed to an electric view finder (EVF), or to an interface for external connection (e.g., a high-definition multimedia interface or HDMI).

The DMA arbitration unit 29 arbitrates contention caused by access requests from the plurality of access control units 21b, 22a to 28a based on, for example, priorities set for the processing units 21 to 28, and grants one access control unit permission for access. The processing unit or circuit corresponding to the access control unit that has been granted the permission for access outputs a control signal for accessing the memory 42. In the case where this control signal is a read request, the memory controller 30 reads data from the memory 42 in accordance with the control signal, and supplies the read data to the request source, namely the corresponding processing unit or circuit. In the case where this control signal is a write request, the memory controller 30 supplies the write request to the memory 42 together with data output from the request source. The memory 42 stores that data.

The CPU 31 controls the image signal processor 20 as a whole. The CPU 31 performs control to, for example, set information necessary for processing to various processing units, and read/write data. The CPU 31 sets operational modes and information (parameters) necessary for various types of processing in accordance with input to the operation unit 41. Examples of the operation unit 41 include: various types of switches that can be operated by a user, such as a shutter button and a menu button; and a touchscreen.

The CPU 31 controls the image capture unit 10. The image capture optical system 11 in the image capture unit 10 may have a zoom function. In accordance with the user's input to the operation unit 41, the CPU 31 changes the position of the lens included in the image capture optical system 11 along an optical axis (an axis perpendicular to a light receiving surface of the image sensor).

A description is now given of distortion correction.

Figure 7:
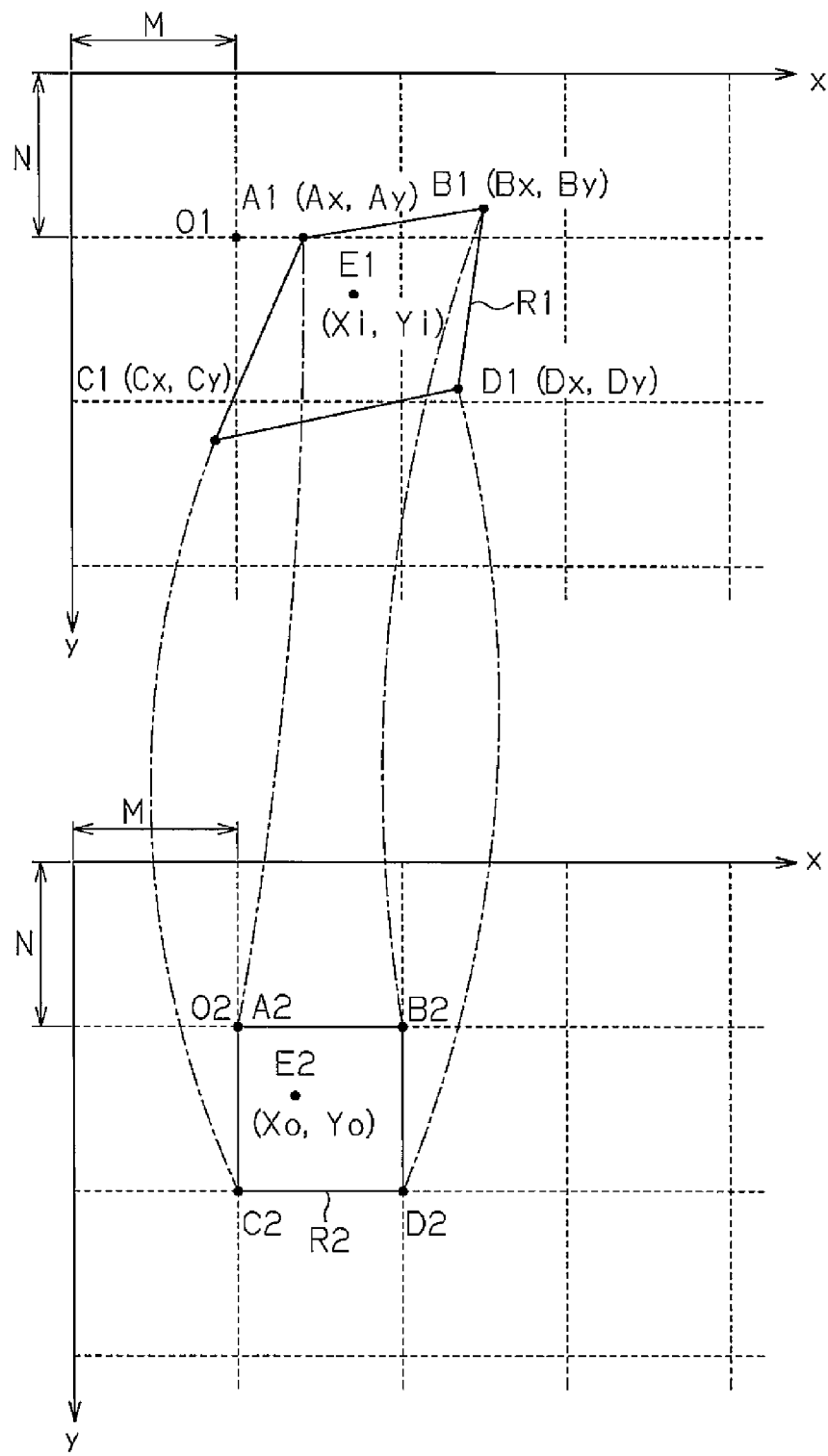
FIG. 7 illustrates distortion correction.

The distortion correction unit 23 applies processing called free transformation or projective transformation to input image data. Free transformation denotes processing for transforming a quadrilateral of an arbitrary shape into a quadrilateral of another shape. By transforming a quadrilateral of an arbitrary shape into a rectangle as a quadrilateral of another shape, distortion in the input image data is corrected or minimized. For example, FIG. 7 illustrates a quadrilateral R1 of an arbitrary shape and a rectangle R2. For example, the upper section of FIG. 7 illustrates an image prior to distortion correction, that is to say, an input image, and the lower section of FIG. 7 illustrates an image after the distortion correction. The quadrilateral R1 has vertices A1, B1, C1, D1. The rectangle R2 has vertices A2, B2, C2, D2. In the correction of transforming the quadrilateral R1 of an arbitrary shape into the rectangle R2, the vertices A1, B1, C1, D1 are respectively converted into the vertices A2, B2, C2, D2. An arbitrary point included in the quadrilateral R1 (including any of the vertices and points on edges connecting the vertexes) is converted into a corresponding point in the rectangle R2 (including any of the vertices and points on edges connecting the vertexes). For example, a point E1 in the quadrilateral R1 is converted into a point E2 in the rectangle R2. The point E2 can be considered as one pixel. Therefore, a pixel value of a pixel E2 after the transformation corresponds to a pixel value of the point E1 prior to the transformation. That is to say, by calculating a coordinate value of the point E1 from a coordinate value of the point E2, coordinate values and pixel values of pixels necessary for the distortion correction can be obtained.

It is assumed here that the coordinates of the point E1 are (Xi, Yi) and the coordinates of the point E2 are (Xo, Yo). It is also assumed here that the coordinate values of the vertexes A1, B1, C1, D1 of the quadrilateral R1 prior to the transformation are respectively (Ax, Ay), (Bx, By), (Cx, Cy), (Dx, Dy). Each coordinate value in the image prior to distortion correction is based on the origin that positionally corresponds to the origin of its counterpart in the image after distortion correction. For example, the image prior to distortion correction and the image after distortion correction are each divided into a grid including blocks of the same size. Each block in the grids (grid block) corresponds to the rectangle R2. In this case, a coordinate value of a point in the rectangle R2 is determined with one vertex O2 of the corresponding grid block R2 serving as the origin. A coordinate value of a point in the quadrilateral R1 is determined with a point O1 corresponding to the point O2 serving as the origin. It is assumed here that the size of each grid block (the number of pixels in each grid block) is "M" in the x-axis direction (horizontal direction), and "N" in the y-axis direction (vertical direction). In view of the above, the coordinates (Xi, Yi) of the point E1 can be obtained using the following formula 1 and formula 2.

$$Xi=[N(Bx-Ax)+\{(Dx-Cx)-(Bx-Ax)\}Yo]Xo/(M\times N)+Ax+(Cx-Ax)Yo/N \quad \text{(Formula 1)}$$

$$Yi=[M(Cy-Ay)+\{(Dy-By)-(Cy-Ay)\}Xo]Yo/(M\times N)+Ay+(By-Ay)Xo/M \quad \text{(Formula 2)}$$

The following describes the horizontal distortion correction unit 21a and the access control unit 21b included in the data conversion unit 21.

Figure 2:
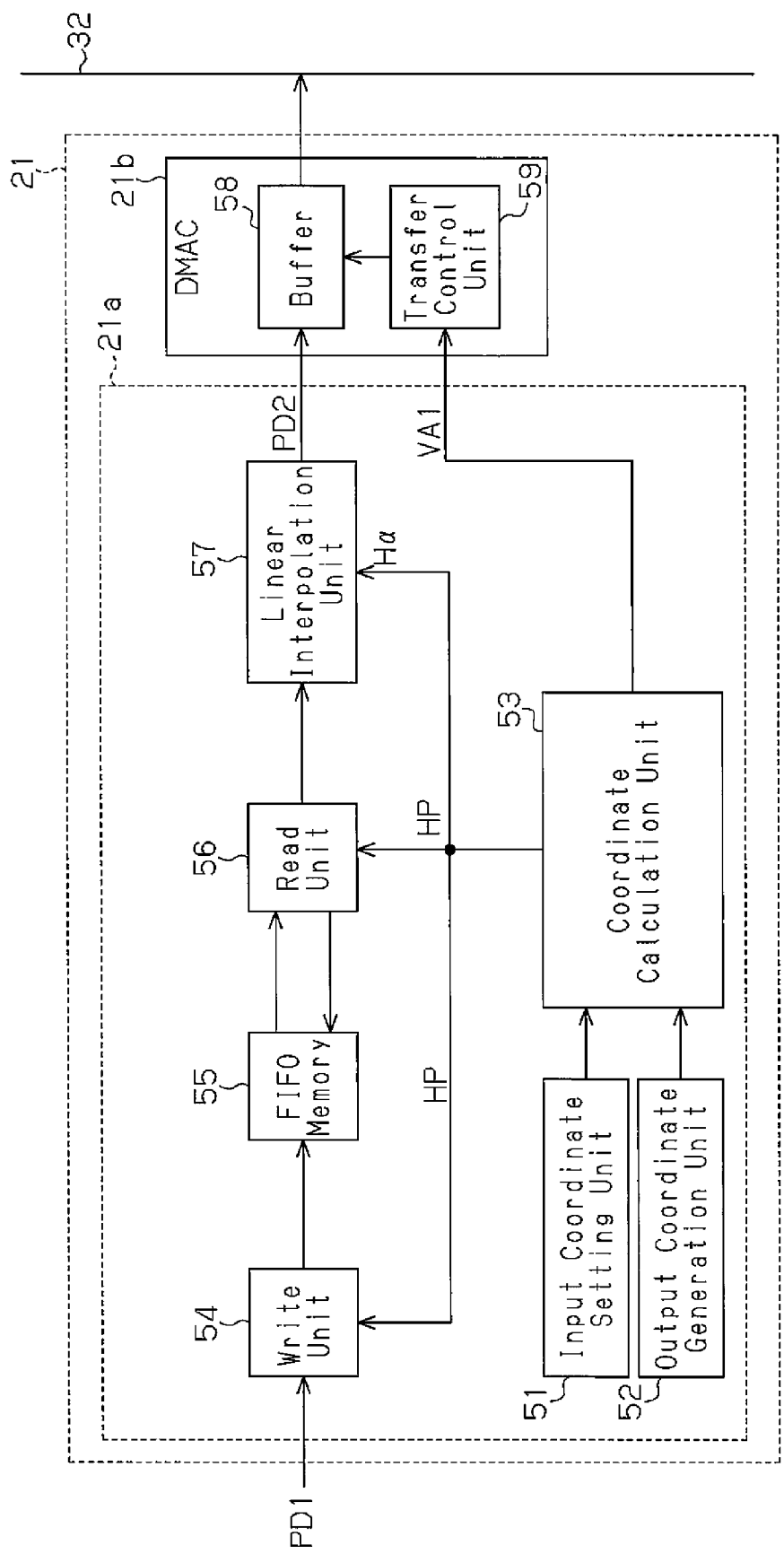
FIG. 2 is a block diagram illustrating a horizontal distortion correction unit and an access control unit.

As illustrated in FIG. 2, the horizontal distortion correction unit 21a includes an input coordinate setting unit 51, an output coordinate generation unit 52, a coordinate calculation unit 53, a write unit 54, a FIFO memory 55, a read unit 56, and a linear interpolation unit 57. The access control unit 21b includes a buffer 58 and a transfer control unit 59.

The input coordinate setting unit 51 stores a coordinate calculation coefficient. The coordinate calculation coefficient is a coefficient that is used to calculate the coordinates of pixels after the horizontal correction (also referred to as output pixels), the coordinates being necessary for generating these pixels in the distortion correction processing. The state of the image capture unit 10, e.g., a positional relationship between the image sensor unit 12 and the image capture optical system 11 (the position of the lens and the like on the optical axis), influences optical distortion that occurs in the image sensor unit 12 due to the aberration of the image capture optical system 11 illustrated in FIG. 1. In view of this, the CPU 31 stores a coordinate calculation coefficient corresponding to the state of the image capture unit 10 into the input coordinate setting unit 51. This coordinate calculation coefficient includes parameters of formula 1 and formula 2. Formula 1 and formula 2 are composed so as to obtain the coordinate value of the point E1 in the quadrilateral R1 corresponding to the point E2 in the rectangle R2 as illustrated in FIG. 7. If the position and the shape of the quadrilateral R1 corresponding to the rectangle R2 are different, parameter values of formula 1 and formula 2 are also different. Therefore, the coordinate calculation coefficient stored in the input coordinate setting unit 51 includes parameters that are set in units of a plurality of grid blocks corresponding to an output image.

The output coordinate generation unit 52 is initialized when starting processing with respect to image data of one frame. The output coordinate generation unit 52 counts pixels of image data output from the horizontal distortion correction unit 21a (output pixels). The image data is transferred in synchronization with a clock signal. This clock signal is, for example, a system clock signal in the image capture device illustrated in FIG. 1. The output coordinate generation unit 52 counts clock signals and outputs the counted value. This counted value corresponds to the coordinate value (Xo, Yo) of each pixel output from the horizontal distortion correction unit 21a. For example, a coordinate value Xo in the horizontal direction is reset by a horizontal synchronization signal, and is incremented by a clock signal indicating a timing of output from the horizontal distortion correction unit 21a. A coordinate value Yo in the vertical direction is incremented by a horizontal synchronization signal, and is reset by a vertical synchronization signal.

The coordinate calculation unit 53 calculates coordinate values of input pixels (input coordinate values) necessary for generating corrected pixels based on the coordinate calculation coefficient read from the input coordinate setting unit 51 and on the coordinate values (Xo, Yo) output from the output coordinate generation unit 52. In one example, the horizontal distortion correction unit 21a applies horizontal distortion correction to input image data. This correction requires horizontal coordinate values (input horizontal coordinates) out of coordinate values of input pixels necessary for calculating the pixel values of corrected pixels. The coordinate calculation unit 53 calculates the values of input horizontal coordinates Xi based on formula 1, and generates input horizontal coordinates HP and interpolation coefficients Ha corresponding to the calculated input horizontal coordinates Xi.

In one example, the value of a calculated input horizontal coordinate Xi includes an integer portion and a decimal portion. This is because all output pixels may not be in one-to-one correspondence with all input pixels due to distortion. The coordinate calculation unit 53 generates an input horizontal coordinate HP with a value equal to the integer portion of a calculated input horizontal coordinate Xi, and an interpolation coefficient Ha with a value equal to the decimal portion of the input horizontal coordinate Xi. The input horizontal coordinates HP are supplied to the write unit 54 and the read unit 56, and the interpolation coefficients Ha are supplied to the linear interpolation unit 57.

The coordinate calculation unit 53 calculates coordinate values of pixels necessary for vertical distortion correction. Coordinate values of pixels necessary for vertical distortion correction include a minimum value and a maximum value of vertical coordinates corresponding to horizontal coordinates (horizontal positions) of pixels. For example, the image illustrated in FIG. 5B, which is distorted into the shape of a barrel, will be enlarged in the vertical direction. Pixels that extend beyond an image range (frame edge) as a result of the enlargement in the vertical direction are unnecessary for the vertical distortion correction processing. In view of this, the coordinate calculation unit 53 calculates a vertical correction range (the minimum value Ymin and the maximum value Ymax of vertical coordinates). In one example, the coordinate calculation unit 53 calculates vertical correction range values VA1 in accordance with the pixel position in the horizontal direction, because a vertical correction range differs depending on the pixel position in the horizontal direction in image data of one frame. The coordinate calculation unit 53 supplies the calculated vertical correction range values VA1 (the minimum value Ymin and the maximum value Ymax of vertical coordinates) to the transfer control unit 59.

Figure 8:
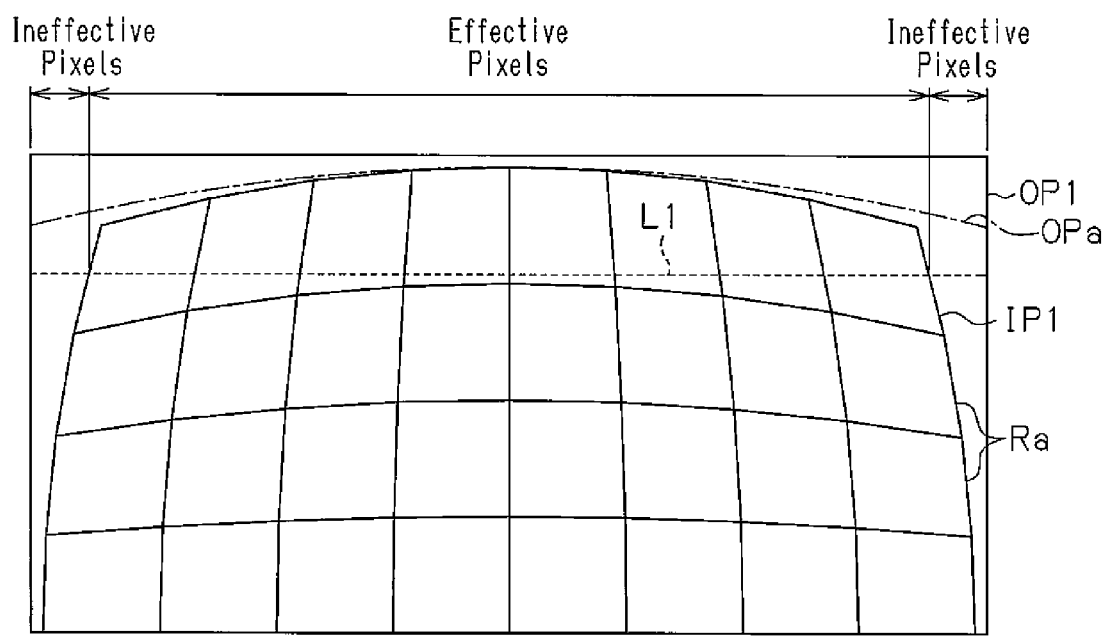
FIG. 8 is a schematic diagram illustrating pixels necessary for distortion correction.

For example, as illustrated in FIG. 8, the coordinate calculation unit 53 generates output image data OP1 by applying horizontal distortion correction processing and vertical distortion correction processing to input image data IP1, which is distorted into the shape of a barrel. Each quadrilateral Ra indicated by solid lines in FIG. 8 represents a range of the input image data IP1 that is necessary for generating image data of the corresponding grid block R2 (see FIG. 7) in the output image data OP1. In FIG. 8, an alternate long and short dash line indicates pixel data OPa obtained by applying the horizontal distortion correction processing to the input image data IP1.

Also, in FIG. 8, a dashed line L1 indicates data of one line (a pixel group of one line) in the horizontal distortion correction processing. In the horizontal distortion correction processing, image data pieces of pixels corresponding to the input image data IP1 with respect to this data L1 of one line represent necessary pixels. In view of this, a range of these necessary pixels in the input image data IP1 is referred to as an effective pixel range. A range of pixels located outside this effective pixel range in the input image data IP1 is referred to as an ineffective pixel range.

Although FIG. 8 illustrates the effective pixel range and the ineffective pixel range of image data in the horizontal direction, the effective pixel range and the ineffective pixel range in the vertical direction are similar to those in the horizontal direction. Therefore, the coordinate calculation unit 53 illustrated in FIG. 2 sets the minimum value of the effective pixel range in the vertical direction as the minimum value Ymin of vertical coordinates, and sets the maxim value of the effective pixel range in the vertical direction as the maximum value Ymax of vertical coordinates.

Based on the input horizontal coordinates HP, the write unit 54 supplies image data pieces of pixels necessary for the horizontal correction processing to the FIFO memory 55. For example, the write unit 54 receives image data PD1 of one pixel (image data of a YCbCr format) in one predetermined cycle, and compares the coordinates of an input pixel with the input horizontal coordinate HP. The coordinates of the input pixel can be obtained by, for example, counting operation clock signals of a circuit that transfers image data. The write unit 54 determines whether or not the input pixel is necessary by comparing the coordinate value of the input pixel with the input horizontal coordinate HP. For example, the image illustrated in FIG. 5B, which is distorted into the shape of a barrel, will be enlarged in the horizontal direction. Therefore, pixels that extend beyond an image range (frame edge) as a result of the enlargement in the horizontal direction are unnecessary for the horizontal distortion correction processing. The write unit 54 supplies, to the FIFO memory 55, the pixel values of pixels other than the unnecessary pixels, that is to say, the pixel values of pixels that have been determined to be necessary.

In one example, the write unit 54 determines whether or not the input pixel is necessary based on the coordinate value of the input pixel and on the result of comparing the coordinate value of the input pixel with a value obtained by adding a predetermined value (e.g., one) to the input horizontal coordinate HP. This determination method is set as a method for generating image data pieces of output pixels. In the horizontal distortion correction unit 21a according to the first embodiment, the later-described linear interpolation unit 57 generates image data pieces of output pixels. The linear interpolation unit 57 generates image data of one output pixel based on image data pieces of two input pixels. As described above, the coordinate calculation unit 53 generates an input horizontal coordinate HP with a value equal to the integer portion of a calculated input horizontal coordinate Xi. Therefore, generation of final image data of a pixel in each line of an output image requires image data of a pixel with a coordinate value obtained by rounding up the decimal portion of the calculated input horizontal coordinate Xi. In view of this, the write unit 54 compares a coordinate value of an input pixel with an input horizontal coordinate HP, and compares a coordinate value of an input pixel with a value obtained by adding the aforementioned predetermined value (e.g., one) to an input horizontal coordinate HP. When a coordinate value of an input pixel matches an input horizontal coordinate HP or a value obtained by the addition, the write unit 54 determines that this input pixel is necessary, and stores image data of this input pixel into the FIFO memory 55.

The FIFO memory 55 stores input data at a position (address) indicated by a write pointer, and outputs data stored at a position (address) indicated by a read pointer. The write unit 54 controls the write pointer in the FIFO memory 55. For example, the write unit 54 outputs a reset signal when starting to store pixels in one line. In response to the reset signal, the FIFO memory 55 resets the write pointer and the read pointer (=0). The FIFO memory 55 stores image data (pixel value) output from the write unit 54 and updates the write pointer (+1). In response to a read request from the read unit 56, the FIFO memory 55 outputs image data stored at the read pointer and updates the read pointer (+1).

The storage capacity of the FIFO memory 55 is set according to a format of image data stored in the FIFO memory 55 and to positions of pixels necessary for correction. For example, in the case where each component has 256 tones (1 byte) in the YCbCr format, a data amount of image data in a so-called 422 format is 2 bytes per pixel, and a data amount of image data in a so-called 444 format is 3 bytes per pixel. The storage capacity according to positions of pixels necessary for correction corresponds to a movement amount of pixels. A movement amount of a pixel is a difference between the coordinate value of an output pixel and the coordinate value of an input pixel necessary for generating that output pixel. This is generally based on the fact that an output pixel is generated by moving an input pixel in the direction of correction. It is necessary to store data into the FIFO memory 55 in accordance with a movement amount of pixels. For example, the storage capacity may need to be twice as large as the movement amount.

The read unit 56 controls the read pointer in the FIFO memory 55 so as to read image data pieces of two consecutive pixels from the FIFO memory 55 and supply the read image data pieces to the linear interpolation unit 57. The read unit 56 may include, for example, a register for storing input horizontal coordinates and image data pieces of a plurality of pixels. Once image data pieces of two or more pixels have been stored into the FIFO memory 55 by the write unit 54, the read unit 56 starts read processing. For example, once the number of image data pieces stored in the FIFO memory 55 has reached the number necessary for interpolation processing, the FIFO memory 55 outputs a signal (enable signal) indicating the start of processing, and the read unit 56 starts the read processing in response to that signal.

First, the read unit 56 stores an input horizontal coordinate HP supplied from the coordinate calculation unit 53 into the register. The read unit 56 outputs a read request to the FIFO memory 55. In response to the read request, the memory outputs image data and updates the read pointer. The read unit 56 stores the image data output from the FIFO memory 55 into the register, and outputs this image data to the linear interpolation unit 57. Then, a read request is output to the FIFO memory 55. In response to the read request, the memory outputs image data and updates the read pointer. The read unit 56 stores the image data output from the FIFO memory 55 into the register, and outputs this image data to the linear interpolation unit 57. In this way, the read unit 56 reads image data pieces of two pixels that are consecutive in the horizontal direction from the FIFO memory 55, and supplies these image data pieces to the linear interpolation unit 57.

Next, the read unit 56 compares the input horizontal coordinate HP supplied from the coordinate calculation unit 53 with the input horizontal coordinate read from the register. When the input horizontal coordinate HP is equal to the input horizontal coordinate read from the register, the read unit 56 successively supplies the image data pieces of two pixels stored in the register to the linear interpolation unit 57. On the other hand, when the input horizontal coordinate HP is different from the input horizontal coordinate read from the register, the read unit 56 stores the input horizontal coordinate HP into the register, and outputs a read request to the FIFO memory 55. Then, the read unit 56 stores image data of one pixel output from the FIFO memory 55 into the register, reads image data of a pixel adjacent to that one pixel from the register, and supplies the read image data to the linear interpolation unit 57. In this way, the read unit 56 outputs, to the linear interpolation unit 57, the image data pieces of two pixels corresponding to the input horizontal coordinate HP supplied from the coordinate calculation unit 53.

The linear interpolation unit 57 applies linear interpolation processing to the image data pieces of two pixels, which have been read from the FIFO memory 55 by the read unit 56, in accordance with the interpolation coefficient Ha supplied from the coordinate calculation unit 53. The linear interpolation unit 57 then outputs processed image data PD2. The linear interpolation unit 57 generates the interpolated image data PD2 by, for example, applying alpha blending to the image data pieces of two pixels. Assume, for example, that the image data (pixel value) of the first pixel output from the read unit 56 is Ga1, and the image data (pixel value) of the second pixel output from the read unit 56 is Ga2. The linear interpolation unit 57 calculates image data Ga3 of an output pixel using the following expression: $Ga3=(1-H\alpha)\cdot Ga1+H\alpha\cdot Ga2$. The linear interpolation unit 57 then outputs the generated image data (pixel value) Ga3.

The storage capacity of the buffer 58 in the access control unit 21b is set according to, for example, a transfer mode of the memory 42 illustrated in FIG. 1. With regard to the memory 42, a time period required to access consecutive addresses (for data writing and data reading) is shorter than a time period required to access random addresses. That is to say, reading and writing can be performed at a higher speed when accessing consecutive addresses than when accessing random addresses. Data transfer of a predetermined amount associated with consecutive addresses is called burst transfer. That is to say, the storage capacity of the buffer 58 is set to a value corresponding to a transfer amount for burst transfer to the memory 42 (burst transfer size). The buffer 58 stores image data output from the linear interpolation unit 57, that is to say, image data after the horizontal distortion correction processing. In accordance with the vertical correction range (the minimum value Ymin and the maximum value Ymax of vertical coordinates) supplied from the coordinate calculation unit 53, the transfer control unit 59 transfers, to the memory 42, image data pieces of pixels necessary for the vertical distortion correction unit 22 illustrated in FIG. 1 out of image data pieces stored in the buffer 58.

The storage capacity of the buffer 58 in the access control unit 21b is set to a value corresponding to a transfer amount for burst transfer to the memory 42 illustrated in FIG. 1 (burst transfer size). The buffer 58 stores image data output from the linear interpolation unit 57, that is to say, image data after the horizontal distortion correction processing. In accordance with the vertical correction range (the minimum value Ymin and the maximum value Ymax of vertical coordinates) supplied from the coordinate calculation unit 53, the transfer control unit 59 transfers, to the memory 42, image data pieces of pixels necessary for the vertical distortion correction unit 22 illustrated in FIG. 1 out of image data pieces stored in the buffer 58.

A description is now given of processing in the transfer control unit 59.

Figure 3:
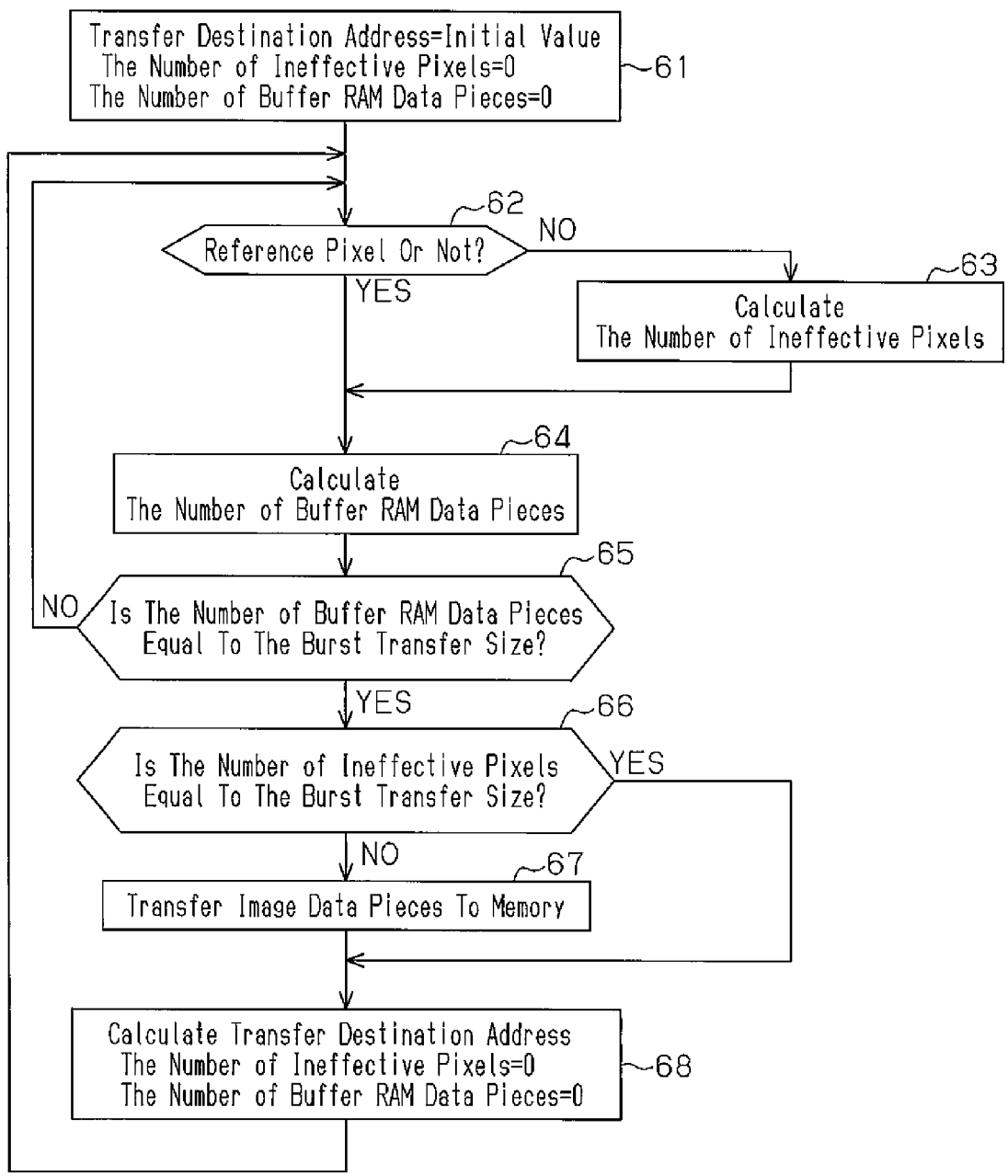
FIG. 3 is a flowchart of transfer processing in an access control unit.

In step 61 illustrated in FIG. 3, parameters are initialized. For example, the parameters to be initialized are a transfer destination address and the number of data pieces stored in the buffer (the number of buffer RAM data pieces). The transfer destination address is set to a default value. The number of buffer RAM data pieces, as well as the number of ineffective pixels, is cleared (=0).

Next, in step 62, a determination is made as to whether or not a pixel stored in the buffer 58 illustrated in FIG. 2 is a reference pixel. The vertical coordinate value of the pixel stored in the buffer 58 is compared with the vertical correction range values VA1 (the minimum value Ymin and the maximum value Ymax of vertical coordinates). If the vertical coordinate value does not fall within the vertical correction range (determination: NO), the processing moves to step 63. In step 63, the number of ineffective pixels is calculated. For example, pixels that are not referenced are considered to be ineffective pixels, and these ineffective pixels are counted. The counted value is the number of ineffective pixels. After the calculation, the processing moves to step 64. On the other hand, if the vertical coordinate value falls within the vertical correction range in step 62 (determination: YES), the processing moves to step 64.

In step 64, the number of buffer RAM data pieces is calculated. For example, "+1" is added to the number of buffer RAM data pieces. After the calculation, the processing moves to step 65.

Thereafter, in step 65, a determination is made as to whether or not the number of buffer RAM data pieces is equal to the burst transfer size. The number of buffer RAM data pieces is the number of pixels for which a determination has been made as to whether or not they are ineffective pixels out of pixels stored in the buffer 58. If the number of buffer RAM data pieces is different from the burst transfer size (determination: NO), the processing moves to step 62. On the other hand, if the number of buffer RAM data pieces is equal to the burst transfer size (determination: YES), the processing moves to the next step 66. That is to say, a determination is made as to whether or not pixels are ineffective pixels in correspondence with the burst transfer size.

Subsequently, in step 66, a determination is made as to whether or not the number of ineffective pixels is equal to the burst transfer size. That is to say, a determination is made as to whether or not all of pixels that are stored in the buffer 58 in correspondence with the burst transfer size are ineffective pixels. If the number of ineffective pixels is not equal to the burst transfer size (determination: NO), the processing moves to the next step 67. If the number of ineffective pixels is equal to the burst transfer size (determination: YES), the processing moves to step 68.

In step 67, image data pieces of pixels that are stored in the buffer 58 in correspondence with the burst transfer size are stored into the memory 42, and the processing moves to step 68. That is to say, if all of pixels that are stored in the buffer 58 in correspondence with the burst transfer size are ineffective pixels, data pieces in the buffer 58 are not stored into the memory 42.

Next, in step 68, each parameter is set for the next data transfer. For example, for the next data transfer, the burst transfer size is added to the transfer destination address. The number of ineffective pixels and the number of buffer RAM data pieces are cleared (=0). Thereafter, the processing moves to step 62.

Figure 4:
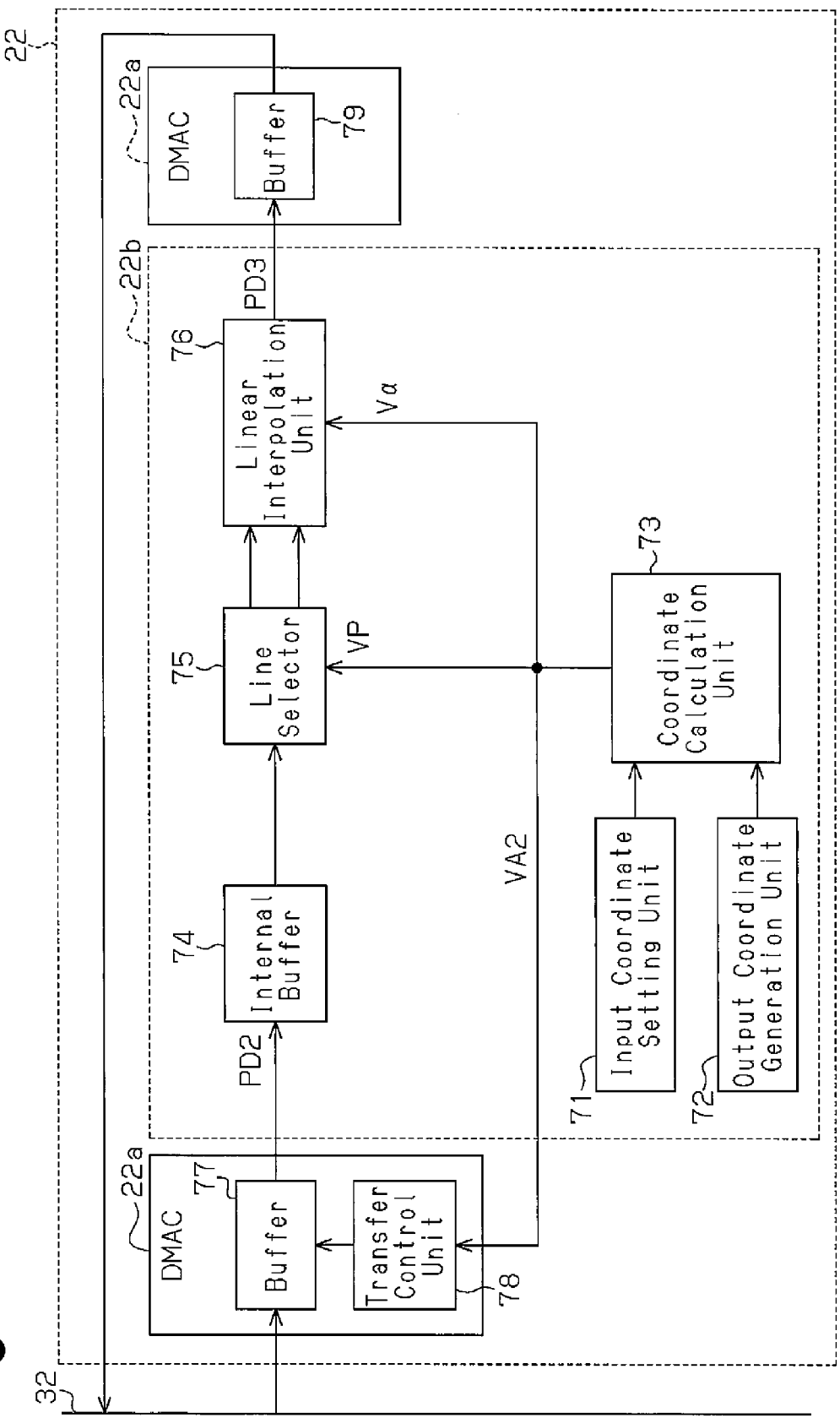
FIG. 4 is a block diagram illustrating a vertical distortion correction unit.

The vertical distortion correction unit 22 will be described. As illustrated in FIG. 4, the vertical distortion correction unit 22 includes the access control unit 22a and a vertical distortion correction core unit 22b. The vertical distortion correction core unit 22b includes an input coordinate setting unit 71, an output coordinate generation unit 72, a coordinate calculation unit 73, an internal buffer 74, a line selector 75, and a linear interpolation unit 76. The access control unit 22a includes an input buffer 77, a transfer control unit 78, and an output buffer 79.

A coordinate calculation coefficient is stored into the input coordinate setting unit 71 by, for example, the CPU 31 illustrated in FIG. 1, similarly to the input coordinate setting unit 51 illustrated in FIG. 2.

Similarly to the output coordinate generation unit 52 illustrated in FIG. 2, the output coordinate generation unit 72 is initialized when starting processing with respect to image data of one frame. The output coordinate generation unit 72 counts pixels of image data pieces output from the vertical distortion correction core unit 22b (output pixels). This counted value is a coordinate value corresponding to each pixel output from the vertical distortion correction core unit 22b (output horizontal coordinate value).

Similarly to the coordinate calculation unit 53 illustrated in FIG. 2, the coordinate calculation unit 73 calculates coordinate values of input pixels (input coordinate values) necessary for generating corrected pixels based on the coordinate calculation coefficient read from the input coordinate setting unit 71 and on the coordinate values output from the output coordinate generation unit 72. The vertical distortion correction core unit 22b corrects vertical distortion in input image data. Therefore, out of the coordinate values of input pixels, pixel values in the vertical direction (input vertical coordinate values) are necessary for calculating the pixel values of corrected pixels. The coordinate calculation unit 73 hence calculates a value of an input vertical coordinate Yi based on formula 2. The coordinate calculation unit 73 generates an input vertical coordinate VP and an interpolation coefficient Vα corresponding to the calculated input vertical coordinate Yi.

In one example, the value of the calculated input vertical coordinate Yi includes an integer portion and a decimal portion. This is because all output pixels may not be in one-to-one correspondence with all input pixels due to distortion. The coordinate calculation unit 73 generates an input vertical coordinate VP with a value equal to the integer portion of the calculated input vertical coordinate Yi, and an interpolation coefficient Vα with a value equal to the decimal portion of the input vertical coordinate Yi. The input vertical coordinate VP is supplied to the line selector 75, and the interpolation coefficient Vα is supplied to the linear interpolation unit 76.

Similarly to the coordinate calculation unit 53 illustrated in FIG. 2, the coordinate calculation unit 73 calculates vertical correction range values VA2 in accordance with the pixel position in the horizontal direction. The coordinate calculation unit 73 outputs the calculated vertical correction range values VA2 (the minimum value Ymin and the maximum value Ymax of vertical coordinates). The vertical correction range values VA2 are supplied to the transfer control unit 78. As described above, the memory 42 illustrated in FIG. 1 is capable of high-speed data transfer through burst transfer. Out of image data pieces in one frame, a plurality of pixels in the horizontal direction are transferred from the memory 42 through a single burst transfer. In view of this, the coordinate calculation unit 73 calculates the vertical correction range values VA2 such that a range of pixels corresponding to a single burst transfer includes pixels necessary for vertical distortion correction.

In accordance with the vertical correction range values VA2, the transfer control unit 78 reads image data pieces corresponding to the burst transfer size from the memory 42. The input buffer 77 stores image data pieces read from the memory 42. Therefore, the storage capacity of the input buffer 77 is set according to the burst transfer size, based on which image data pieces are read from the memory 42.

Figure 9:
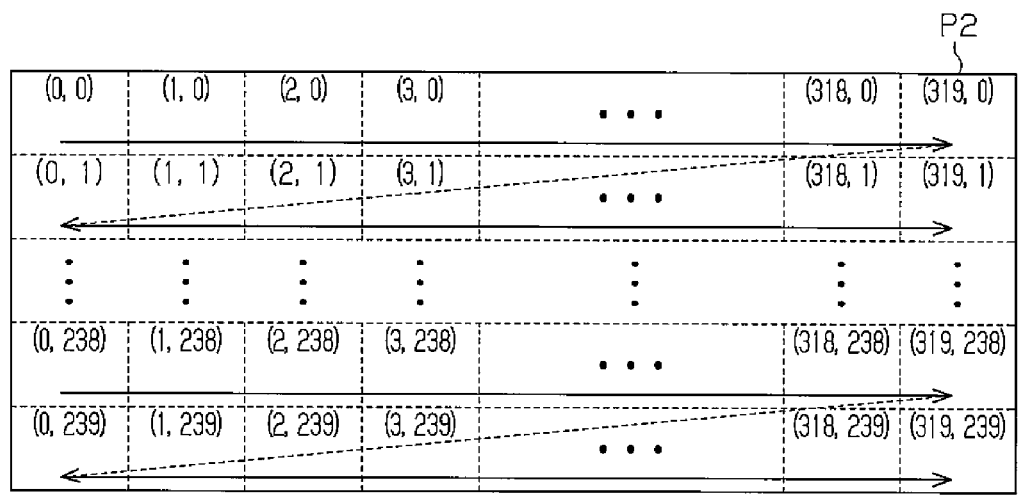
FIGS. 9 and 10 illustrate the transfer order for image data pieces.

FIG. 9 illustrates image data pieces stored in the memory 42. Pixels included in image data pieces P2 are designated using coordinates (X, Y) with a pixel at a predetermined position (e.g., the upper-left pixel in FIG. 9) serving as the origin. Coordinates X and Y respectively indicate a position in the width direction (horizontal direction) and a position in the height direction (vertical direction) in FIG. 9. The image data pieces P2 are transferred from the image capture unit 10 to the memory 42 via the data conversion unit 21, which are all illustrated in FIG. 1. For example, these image data pieces P2 are transferred in raster order indicated by arrows in FIG. 9, and are stored in the memory 42 in transfer order.

The memory 42 stores a sequence of image data pieces that have been successively transferred in transfer order. Therefore, pixels that are consecutive in the raster direction (horizontal direction) are stored into areas of consecutive addresses in the memory 42. This storage is preferable because, in general, a time period (access time period) required to access consecutive addresses is shorter than a time period required to access inconsecutive addresses in the memory 42. In the horizontal distortion correction processing, image data of an output pixel is generated based on image data pieces of two pixels that have been consecutively transferred in the horizontal direction, and the generated image data is stored into the memory 42. As the transfer order of image data pieces matches the direction in which two pixels necessary for the horizontal distortion correction processing are arranged, the efficiency of the horizontal distortion correction processing and the efficiency of data transfer to the memory 42 are excellent. On the other hand, vertical distortion correction processing requires pixels that are arranged in the vertical direction in image data pieces of one frame. That is to say, the transfer order of image data pieces does not match the direction (vertical) in which two pixels necessary for the vertical distortion correction processing are arranged. Therefore, simple reading in the vertical direction may deteriorate the efficiency of data transfer to the memory 42. For this reason, in order to achieve both the efficiency of distortion correction processing and the efficiency of data transfer to the memory 42, data transfer to the memory 42 is performed as follows in the first embodiment.

Figure 10:
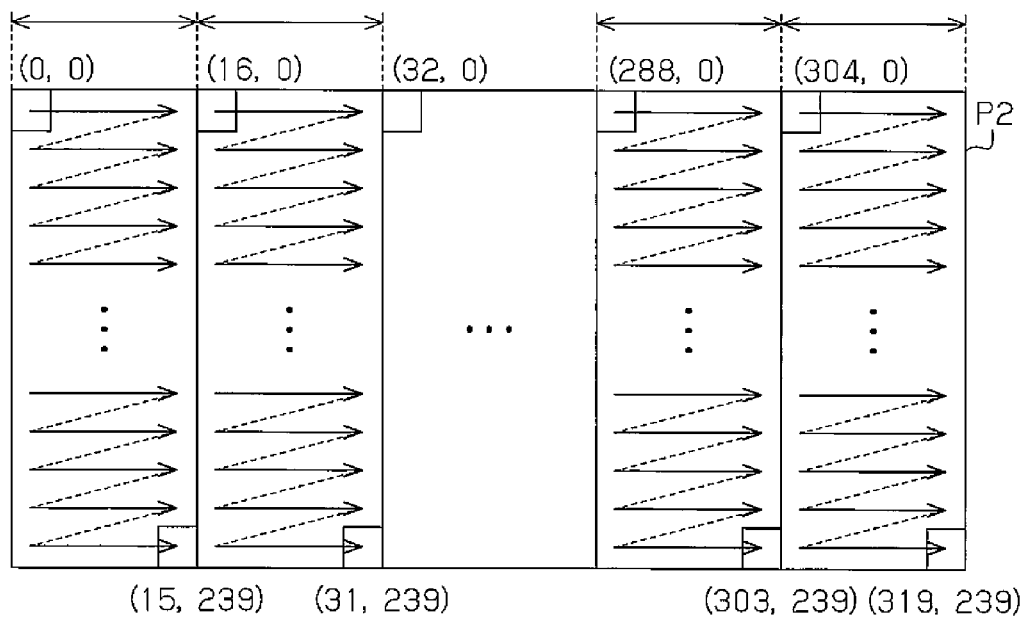

As illustrated in FIG. 10, the transfer control unit 78 successively reads image data pieces that are arranged in the horizontal direction and correspond to the burst transfer size along the vertical direction. For example, in the case of image data pieces of one screen illustrated in FIG. 10, the number of pixels in the horizontal direction is 320, and the number of pixels in the vertical direction is 240. The coordinate value of a pixel at the upper-left corner is (0, 0), and the coordinate value of a pixel at the lower-right corner is (319, 239). The burst transfer size of the memory 42 corresponds to 16 pixels. In this case, the transfer control unit 78 first reads image data pieces of pixels from coordinates (0, 0) to coordinates (15, 0). The transfer control unit 78 then reads image data pieces of pixels from coordinates (0, 1) to coordinates (15, 1), that is to say, pixels obtained by changing the vertical coordinates by one pixel. In the following description, an area that includes a number of pixels corresponding to the burst transfer size in the horizontal direction, as well as a number of lines corresponding to one screen (e.g., an area from coordinates (0, 0) to coordinates (15, 239)), is referred to as a rectangular area. That is to say, reading of image data pieces by the transfer control unit 78 involves dividing image data pieces of one screen into a plurality of rectangular areas that each includes a number of pixels corresponding to the burst transfer size in the horizontal direction, and reading of image data pieces for each rectangular area.

At this time, the transfer control unit 78 reads image data pieces in each rectangular area in accordance with the vertical correction range values VA2, such that image data pieces of pixels corresponding to the burst transfer size include pixels necessary for the vertical distortion correction processing. The following describes an example in which output image data pieces OP1 illustrated in FIG. 11B are generated from input image data pieces IP1 illustrated in FIG. 11A. Hatched portions in FIG. 11B represent image data pieces of pixels in the first line and the $n^{th}$ line of an output image (n being the number of lines in an image corresponding to one frame; for example, n=240 in the case of image data pieces illustrated in FIG. 9). Hatched portions in FIG. 11A represent pixels in an input image that are necessary for generating the image data pieces of hatched pixels illustrated in FIG. 11B.

Images of the first line through the $n^{th}$ line in the output image data pieces OP1 are generated from images of the second line through the $(n-1)^{th}$ line in the input image data pieces IP1. The transfer control unit 78 does not read image data pieces of pixels in the first line and the $n^{th}$ line of the input image data pieces IP1 from the memory 42. Therefore, the number of times the memory 42 is accessed is reduced.

Image data pieces that are once stored into the input buffer 77 are transferred to the internal buffer 74 in the vertical distortion correction core unit 22b. The storage capacity of this internal buffer 74 is set so as to allow storage of pixels necessary for vertical distortion correction. For example, in the vertical distortion correction processing, pixels move when generating vertical pixels based on input pixels, similarly to the horizontal distortion correction processing. Therefore, pixels of lines corresponding to the movement amount are necessary. For this reason, the storage capacity of the internal buffer 74 is set according to the burst transfer size and the movement amount.

Figure 11A:
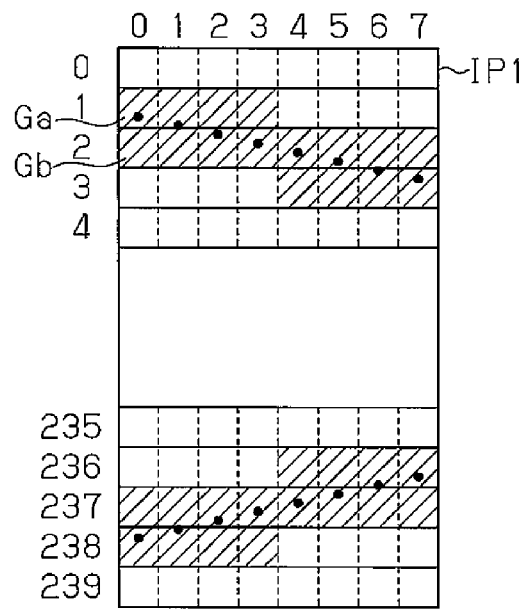
FIGS. 11A and 11B are diagrams for describing distortion correction processing.
Figure 11B:
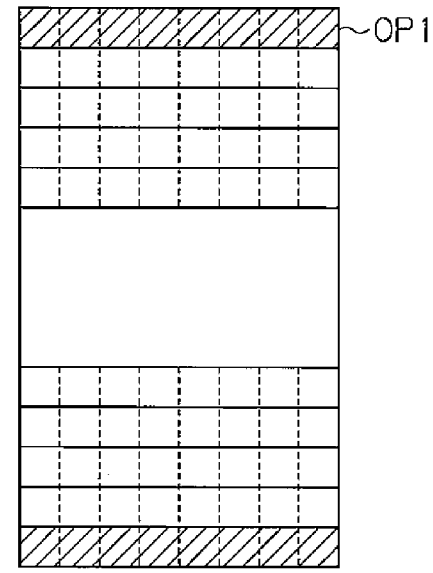

Black dots illustrated in FIG. 11A represent coordinate values of pixels that are necessary for generating hatched pixels of one line illustrated in FIG. 11B. These coordinate values are calculated by the coordinate calculation unit 73 and include integer portions and decimal portions. In the first embodiment, as image data of an output pixel is generated through linear interpolation, the vertical distortion correction processing requires image data pieces of two pixels that correspond to a calculated coordinate value and are adjacent in the vertical direction.

Figure 12A:
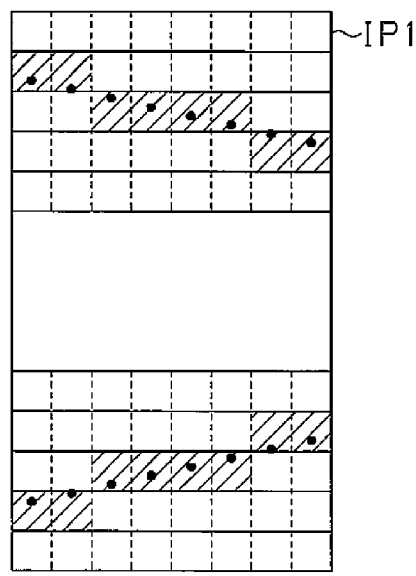
FIGS. 12A and 12B are diagrams for describing distortion correction processing in a comparative example.
Figure 12B:
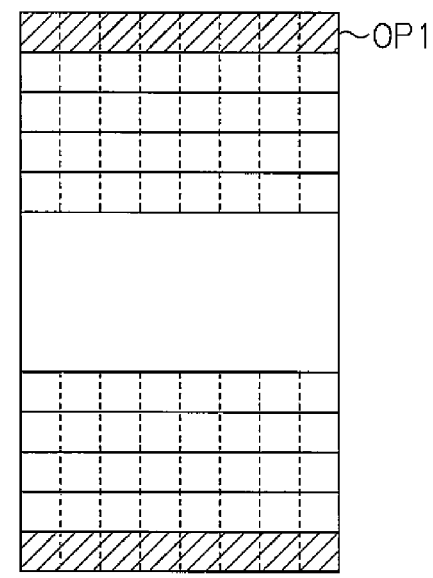

FIGS. 12A and 12B illustrate a comparative example in which output pixels are generated using a nearest neighbor method. In this comparative example, one pixel that is nearest to the calculated pixel coordinate value (whose vertical coordinate value illustrates the smallest difference) is used as a pixel necessary for generating an output pixel. Therefore, minute portions and edges of an image are displayed in a stepwise manner, with the result that the appearance of the image is degraded, that is to say, the image quality of the output image is deteriorated. In this regard, according to the first embodiment, output pixels are generated through linear interpolation, and therefore the image quality of an output image is relatively high.

In accordance with the input vertical coordinate VP, the line selector 75 selects two lines out of image data pieces of a plurality of lines stored in the internal buffer 74. For example, the line selector 75 selects one line corresponding to the input vertical coordinate VP and a line next to the input vertical coordinate VP. The line selector 75 outputs image data pieces Ga, Gb of pixels included in the selected two lines, the image data pieces Ga, Gb having coordinate values corresponding to pixels to be output after the interpolation processing (output horizontal coordinate values).

The following describes an example in which the image data pieces of hatched pixels illustrated in FIG. 11A are read. In FIG. 11A, the numbers provided along the upper edge of the image data pieces IP represent horizontal coordinate values, and the numbers provided along the left edge of the image data pieces IP represent vertical coordinate values (in the case where the number of lines n=240).

First, the line selector 75 selects lines with vertical coordinate values "1" and "2" in accordance with the input vertical coordinate VP. The line selector 75 outputs image data pieces Ga, Gb of two pixels with a horizontal coordinate value "0" in accordance with the coordinate value output from the output coordinate generation unit 72 (output horizontal coordinate value). In a similar manner, the line selector 75 successively outputs image data pieces of pixels with horizontal coordinate values "1" to "3".

Next, the line selector 75 selects lines with coordinate values "2" and "3" in accordance with the input vertical coordinate VP. The line selector 75 outputs image data pieces of pixels with coordinate values "4" to "7" in accordance with the coordinate value output from the output coordinate generation unit 72 (output horizontal coordinate value).

In accordance with the interpolation coefficient Vα supplied from the coordinate calculation unit 73, the linear interpolation unit 76 applies linear interpolation processing to the image data pieces Ga, Gb of two pixels, which have been read by the line selector 75 from the internal buffer 74. The linear interpolation unit 76 outputs the processed image data pieces. The linear interpolation unit 76 generates interpolated image data by, for example, applying alpha blending to image data pieces of two pixels. For example, provided that the image data pieces Ga, Gb of the first and second pixels output from the internal buffer 74 respectively have pixel values Ga1, Ga2, the linear interpolation unit 57 calculates a pixel value Ga3 of image data of a pixel to be output using the following expression: Ga3=(1−Vα)·Ga1+Vα·Ga2. The linear interpolation unit 76 outputs the image data of the calculated pixel value Ga3.

The access control unit 22a stores image data pieces output from the linear interpolation unit 76 into the output buffer 79. Once image data pieces transferred through a single burst transfer have been stored into the output buffer 79, the access control unit 22a stores these image data pieces into the memory 42 illustrated in FIG. 1.

The following describes the operations of the image signal processor 20 (the horizontal distortion correction unit 21a and the vertical distortion correction unit 22).

Using the linear interpolation unit 57, the horizontal distortion correction unit 21a generates image data of one output pixel based on image data pieces of two input pixels. The linear interpolation unit 57 generates image data pieces of output pixels through linear interpolation processing, in which decimal portions of coordinate values of input pixels calculated in accordance with coordinate values of output pixels are used as an interpolation coefficient. In this way, an image including less stepwise portions can be obtained compared to the case where output pixels are generated using the nearest neighbor processing.

The write unit 54 stores image data pieces necessary for generating image data pieces of output pixels into the FIFO memory 55 based on the coordinate values generated by the coordinate calculation unit 53. In accordance with the vertical correction range generated by the coordinate calculation unit 53 (the minimum value Ymin and the maximum value Ymax of vertical coordinates), the transfer control unit 59 in the access control unit 21b transfers, to the memory 42, the image data pieces of pixels that are stored in the buffer 58 and are necessary for the vertical distortion correction unit 22 illustrated in FIG. 1. In this way, image data pieces of pixels necessary for processing are transferred to the memory 42.

Based on the vertical correction range values VA2 generated by the coordinate calculation unit 73 (the minimum value Ymin and the maximum value Ymax of vertical coordinates), the transfer control unit 78 in the vertical distortion correction unit 22 reads image data pieces corresponding to the burst transfer size from the memory 42, and stores the read image data pieces once into the input buffer 77. These image data pieces stored in the input buffer 77 are transferred to the internal buffer 74. In accordance with the input vertical coordinate VP generated by the coordinate calculation unit 73, the line selector 75 selects two lines out of image data pieces of a plurality of lines stored in the internal buffer 74. The line selector 75 outputs the image data pieces Ga, Gb of pixels included in the selected two lines, the image data pieces Ga, Gb having coordinate values corresponding to pixels to be output after the interpolation processing (output horizontal coordinate values). In accordance with the interpolation coefficient Vα supplied from the coordinate calculation unit 73, the linear interpolation unit 76 applies linear interpolation processing to the image data pieces Ga, Gb of two pixels, which have been read by the line selector 75 from the internal buffer 74. The linear interpolation unit 76 outputs the processed image data pieces. In this way, image data pieces of pixels necessary for the vertical distortion correction processing are read from the memory 42, and image data pieces of an image after distortion correction are generated based on the read image data pieces.

The following advantages are achieved in the first embodiment.

(1-1) The transfer control unit 59 stores, into the memory 42, image data pieces of pixels that are necessary for the vertical distortion correction unit 22 to generate image data pieces of output pixels. In this configuration, the number of times the image signal processor 20 accesses the memory 42 is reduced compared to the case where the vertical distortion correction unit 22 stores image data pieces of one frame into the memory 42.

(1-2) Based on the range values VA2 generated by the coordinate calculation unit 73, the transfer control unit 78 in the vertical distortion correction unit 22 reads image data pieces necessary for the vertical distortion correction unit 22 out of data pieces stored in the memory 42. The transfer control unit 78 stores the read image data pieces into the internal buffer 74. In this configuration, the number of times the image signal processor 20 accesses the memory 42 is reduced compared to the case where the vertical distortion correction unit 22 reads image data pieces of one frame from the memory 42.

(1-3) Based on the vertical correction range values VA2 generated by the coordinate calculation unit 73 (the minimum value Ymin and the maximum value Ymax of vertical coordinates), the transfer control unit 78 in the vertical distortion correction unit 22 reads image data pieces corresponding to the burst transfer size from the memory 42. The transfer control unit 78 stores the read image data pieces into the input buffer 77. These image data pieces read into the input buffer 77 are stored into the internal buffer 74. Therefore, the internal buffer 74 stores image data pieces of pixels necessary for the vertical distortion correction. As unnecessary image data pieces are not stored into the internal buffer 74, the internal buffer 74 with a small capacity can be used. This makes it possible to suppress an increase in the circuit scale of the vertical distortion correction unit 22, and makes it easy to mount the vertical distortion correction unit 22.

A description is now given of a second embodiment with reference to FIGS. 13 to 22B.

In the second embodiment, components that are the same as those in the first embodiment are given the same reference signs thereas, and all or a part of a description thereof is omitted.

Figure 13:
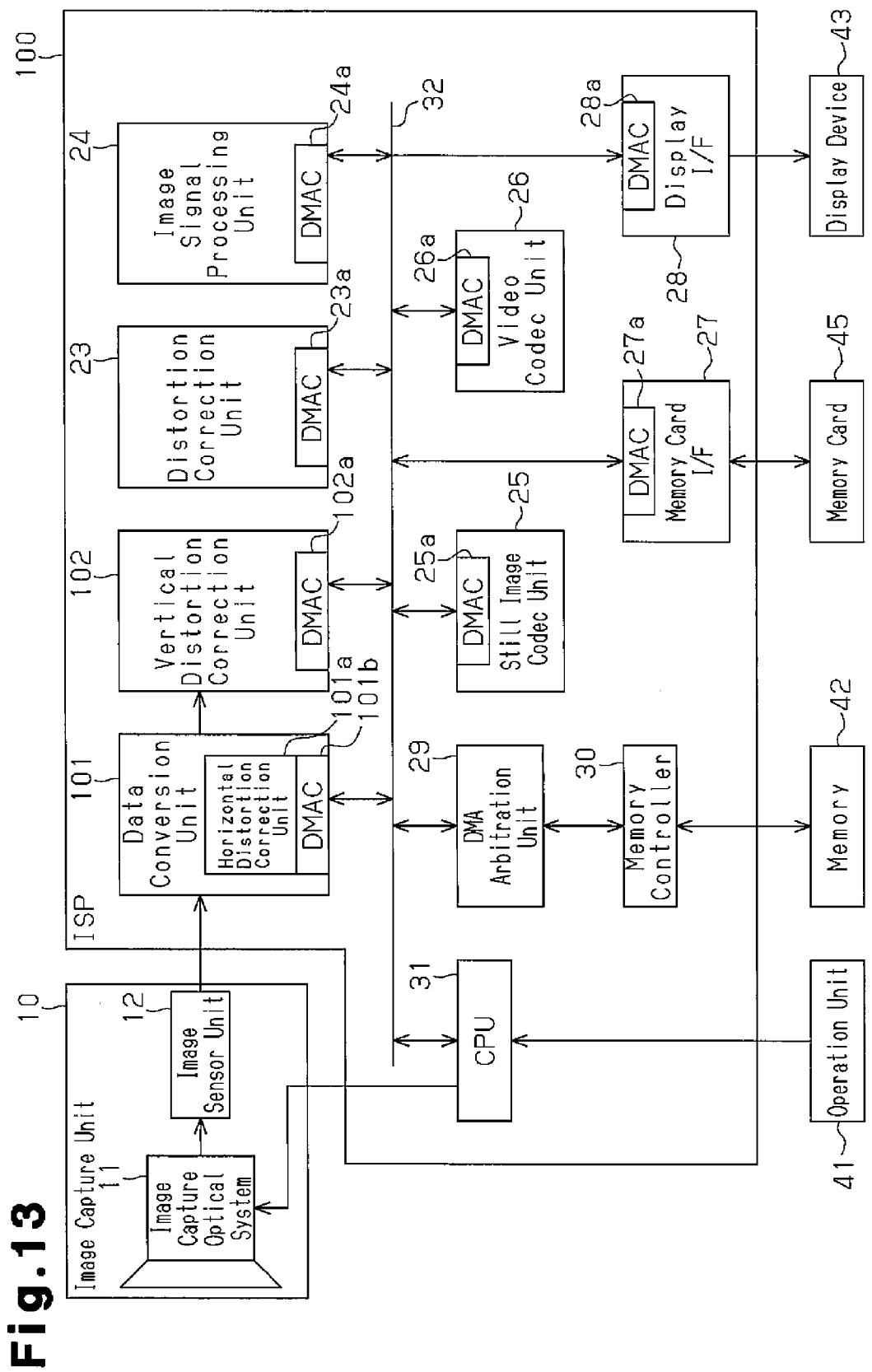
FIG. 13 is a schematic block diagram illustrating an image capture device according to a second embodiment.

As illustrated in FIG. 13, an image capture device includes an image capture unit 10, an image signal processor 100, an operation unit 41, a memory 42, and a display device 43.

The image signal processor 100 includes a data conversion unit 101, a vertical distortion correction unit 102, a distortion correction unit 23, an image signal processing unit 24, a still image codec unit 25, a video codec unit 26, a memory card I/F 27, a display I/F 28, a DMA arbitration unit 29, a memory controller 30, and a CPU 31.

Similarly to the data conversion unit 21 illustrated in FIG. 1, the data conversion unit 101 converts a data format of image capture data output from the image capture unit 10 (e.g., an RGB format) into a predetermined format (e.g., a YCbCr format), and outputs the converted image data in accordance with a predetermined setting (e.g., whether or not distortion correction is necessary). For example, in the case where distortion correction is performed, the converted image data is supplied from the data conversion unit 101 to a horizontal distortion correction unit 101a. Similarly to the horizontal distortion correction unit 21a illustrated in FIG. 1, the horizontal distortion correction unit 101a applies horizontal distortion correction processing to the supplied image data, and supplies the processed image data to the vertical distortion correction unit 102. In the case where distortion correction is not performed, the converted image data is stored into the memory 42 from the data conversion unit 101 via an access control unit 101b.

The vertical distortion correction unit 102 applies vertical distortion correction processing to the image data output from the horizontal distortion correction unit 101a. The vertical distortion correction unit 102 includes an access control unit 102a. The access control unit 102a stores the processed image data supplied from the vertical distortion correction unit 102 into the memory 42. The vertical distortion correction unit 102 is one example of a second distortion correction unit and a second correction unit.

In the case where distortion correction processing is executed, the horizontal distortion correction unit 101a supplies image data to which horizontal distortion correction processing has been applied to the vertical distortion correction unit 102. The vertical distortion correction unit 102 applies vertical distortion correction processing to the image data supplied from the horizontal distortion correction unit 101a, i.e., the image data to which the horizontal distortion correction processing has been applied. That is to say, the image signal processor 100 does not access the memory 42 to write image data after the horizontal distortion correction processing from the horizontal distortion correction unit 101a to the memory 42, or to read image data after the horizontal distortion correction processing from the memory 42 to the vertical distortion correction unit 102. Therefore, the number of times the image signal processor 100 accesses the memory 42 is reduced.

Figure 14:
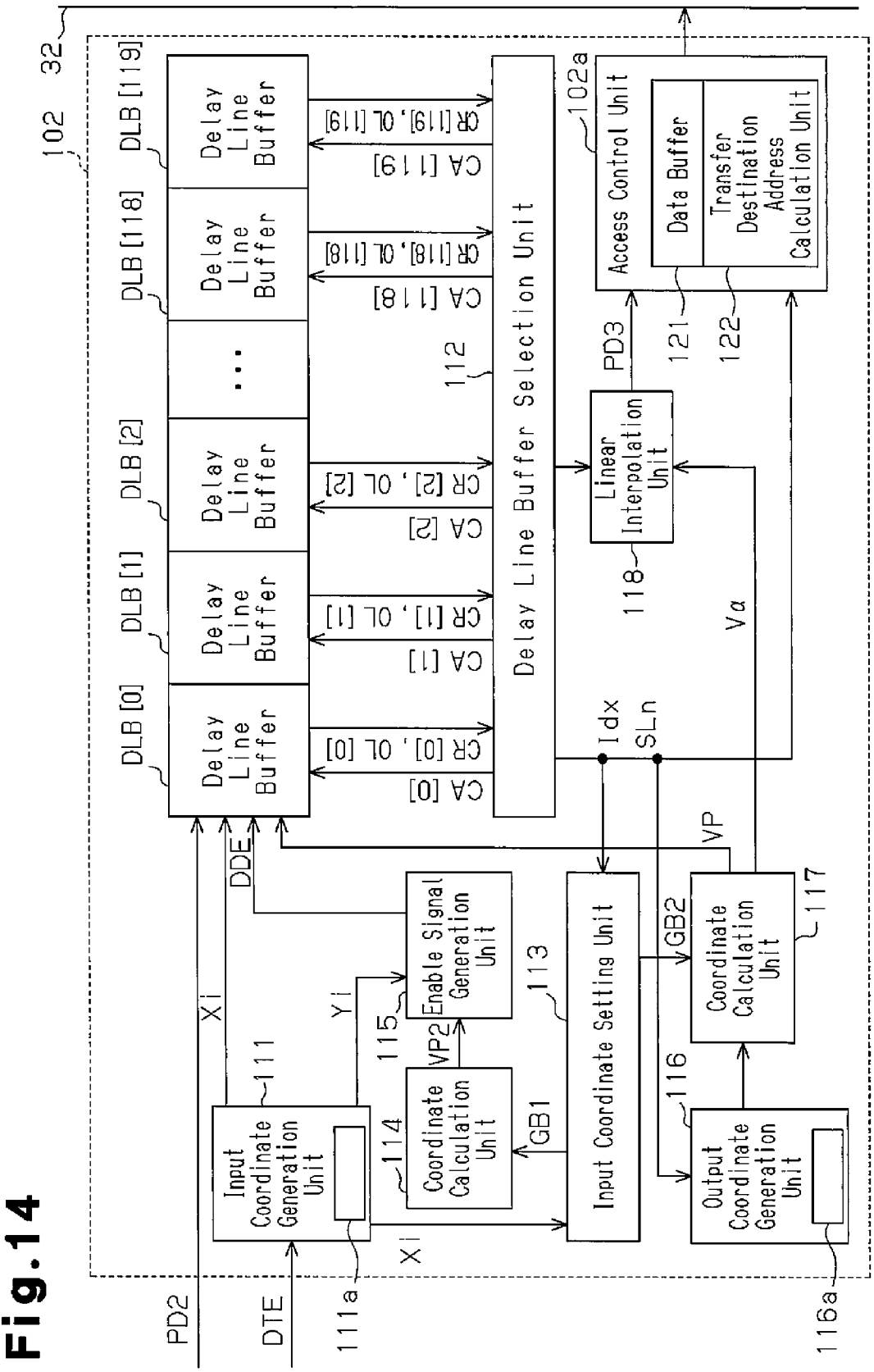
FIG. 14 is a block diagram illustrating a vertical distortion correction unit.

As illustrated in FIG. 14, the vertical distortion correction unit 102 includes an input coordinate generation unit 111, an output coordinate generation unit 116, an input coordinate setting unit 113, a coordinate calculation unit 114, a coordinate calculation unit 117, an enable signal generation unit 115, a plurality of delay line buffers DLB, a delay line buffer selection unit 112, a linear interpolation unit 118, and the access control unit 102a.

The number of the delay line buffers DLB is set according to a transfer data amount for a single access to the memory 42 illustrated in FIG. 13 (a burst transfer amount) and the number of pixels in image data pieces of one frame in the horizontal direction. An index value is set to each delay line buffer DLB. For example, index values are [0] to [119]. The delay line buffers DLB may be expressed using the index values, e.g., as delay line buffers DLB [0] to DLB [119], so as to distinguish between the delay line buffers DLB and between data pieces related thereto.

The input coordinate generation unit 111 generates a coordinate value of an input pixel in response to an enable signal DDE. The input coordinate generation unit 111 includes, for example, a counter 111a. The counter 111a is initialized when starting processing with respect to image data of one frame. The counter 111a is activated in response to an enable signal DTE supplied from the horizontal distortion correction unit 101a, and counts pixels of image data pieces output from the horizontal distortion correction unit 101a (output pixels). Image data is transferred in synchronization with a clock signal. This clock signal is, for example, a system clock signal in the image signal processor 100 illustrated in FIG. 13. The counter 111a counts clock signals and outputs a counted value. This counted value corresponds to the coordinate value (Xi, Yi) of an input pixel supplied to the vertical distortion correction unit 102. For example, a horizontal coordinate value Xi corresponds to each pixel in one line, and is reset by, for example, a horizontal synchronization signal. A vertical coordinate value Yo is incremented upon reset of a horizontal coordinate value Xi, and is reset upon completion of one frame, for example, by a vertical synchronization signal. A horizontal coordinate value Xi is supplied to the input coordinate setting unit 113 and to the delay line buffers DLB [0] to DLB [119]. A vertical coordinate value Yi is supplied to the enable signal generation unit 115.

For each line data in image data pieces of one frame, each of the delay line buffers DLB [0] to DLB [119] can store image data pieces of pixels that correspond in number to data pieces that have been transferred through a single burst transfer to the memory 42 illustrated in FIG. 13. For image data pieces of one frame, each of the delay line buffers DLB [0] to DLB [119] stores image data pieces of pixels with corresponding input horizontal coordinates Xi based on an enable signal DDE, the corresponding input horizontal coordinates Xi, and a vertical input coordinate generated by the later-described coordinate calculation unit 117.

For example, provided that the size of image data pieces in one frame is 1920×1088 (pixels) and a burst transfer amount for the memory 42 corresponds to 16 pixels, each of the delay line buffers DLB [0] to DLB [119] stores image data pieces of 16 pixels for each line in image data pieces of one frame. The number of lines that can be stored in each of the delay line buffers DLB [0] to DLB [119] is set according to a movement amount of pixels in vertical distortion correction.

For example, when the enable signal DDE is at the first level (e.g., H level), the delay line buffer DLB [0] stores image data pieces PD2 into a corresponding area in response to input horizontal coordinates Xi of "0" to "15". Similarly, when the enable signal DDE is at the first level (e.g., H level), the delay line buffer DLB [1] stores image data pieces PD2 into a corresponding area in response to input horizontal coordinates Xi of "16" to "31". When the enable signal DDE is at the first level (e.g., H level), the delay line buffer DLB [119] stores image data pieces PD2 into a corresponding area in response to input horizontal coordinates Xi of "1904" to "1919". On the other hand, when the enable signal DDE is at the second level (e.g., L level), none of the delay line buffers DLB [0] to DLB [119] stores image data pieces even with corresponding input horizontal coordinates Xi.

After storing image data pieces of pixels necessary for vertical distortion correction based on an input vertical coordinate, the delay line buffers DLB [0] to DLB [119] supply corresponding calculation requests CR [0] to CR [119], as well as corresponding output line numbers OL [0] to OL [119], to the delay line buffer selection unit 112. The delay line buffers DLB [0] to DLB [119] reset the calculation requests CR [0] to CR [119] in response to calculation request acceptances CA [0] to CA [119] output from the delay line buffer selection unit 112, and successively output image data pieces of pixels included in lines necessary for vertical distortion correction processing.

The delay line buffer selection unit 112 accepts one calculation request CR out of the calculation requests CR [0] to CR [119] output from the plurality of delay line buffers DLB [0] to DLB [119], and returns a calculation request acceptance CA to the delay line buffer that has output the accepted calculation request CR.

The delay line buffer selection unit 112 outputs an index value Idx corresponding to the delay line buffer DLB whose calculation request CR has been accepted. Index values Idx are numbers allocated to identify the plurality of delay line buffers, and correspond to horizontal coordinate values (X) of pixels. Each index value Idx is equal to an integer value obtained by dividing a coordinate value (Xi) of pixels stored in corresponding one of the delay line buffers DLB [0] to DLB [119] by the number of pixels stored in that delay line buffer DLB [0] to DLB [119] in the horizontal direction (e.g., "16"). The delay line buffer selection unit 112 outputs an output line number SLn that is equal to the output line number OL from the delay line buffer DLB whose calculation request CR has been accepted. The delay line buffer selection unit 112 successively supplies, to the linear interpolation unit 118, image data pieces of two lines output from the delay line buffer whose calculation request CR has been accepted.

After outputting image data pieces corresponding to the number of pixels in the delay line buffers DLB [0] to DLB [119] in the horizontal direction, the delay line buffer selection unit 112 resets the calculation request acceptances CA [0] to CA [119]. The delay line buffer selection unit 112 accepts the next calculation request CR, and outputs a calculation request acceptance CA to the delay line buffer that has output the accepted calculation request CR.

The input coordinate setting unit 113 stores tables of setting values corresponding to grid blocks of image data pieces. The setting values are necessary for calculating coordinate values of input pixels corresponding to coordinate values of output pixels in corresponding grid blocks. The setting values include Y coordinate values Ay to Dy of the vertexes A1 to D1 in formula 2. In one example, the size of each grid block (the number of pixels M in the horizontal direction (x-axis direction) and the number of pixels N in the vertical direction (y-axis direction)) is set to a predetermined value (e.g., "64"). A value of a table corresponding to one grid block may be expressed as "GTBL [m] [n]". Here, [m] denotes a horizontal coordinate value of the grid block, and [n] denotes a vertical coordinate value of the grid block.

For example, provided that the size of image data pieces in one frame (the number of pixels in the horizontal direction x the number of pixels in the vertical direction) is "1920×1088" and the size of one grid block is "64×64" (M=N=64), the number of tables corresponding to image data pieces in one frame is 30 in the horizontal direction (m=0 to 29), and 17 in the vertical direction (n=0 to 16).

It will be assumed that a table including coordinate values (vertical coordinate values) of vertexes corresponding to a grid block GB (m, n) is "GTBL [m] [n]". For example, referring to FIG. 7, image data pieces of pixels in the grid block R2 are generated based on image data pieces of pixels included in the quadrilateral R1. Coordinate values of pixels in the quadrilateral R1 are calculated based on coordinate values Ay, By, Cy, Dy of the vertexes A1, B1, C1, D1 of the quadrilateral R1. It will be assumed that the coordinate value of this grid block R1 is m=1, n=1. In this case, the coordinates of the vertexes corresponding to the grid block R1 are referenced as "GTBL [1] [1]".

Based on the horizontal coordinate values Xi supplied from the input coordinate generation unit 111, the input coordinate setting unit 113 supplies, to the coordinate calculation unit 114, first grid block coordinates GB1 including coordinates of vertexes of two grid blocks corresponding to output pixels. In the vertical distortion correction unit 102, a horizontal coordinate value Xo of an output pixel is equal to a horizontal coordinate value Xi of an input pixel. Therefore, the input coordinate setting unit 113 selects tables of two grid blocks corresponding to a coordinate value Xo (=Xi) of an output pixel.

The tables of two grid blocks selected by the input coordinate setting unit 113 are used to calculate a vertical range of an input pixel necessary for generating image data pieces in one frame with respect to the coordinate value Xo. That is to say, the two grid blocks are composed of a grid block including pixels with the coordinate value Xo in the first line of image data pieces in one frame, and a grid block including pixels with the coordinate value Xo in the last line of image data pieces in one frame. The Y coordinates of these grid blocks are set in accordance with the number of pixels in image data pieces of one frame (the number of lines) and the number of pixels (N) in the grid blocks in the vertical direction. For example, the Y coordinates of these grid blocks are "0" and "16". The X coordinate of these grid blocks has a value of an integer portion that is obtained as a result of dividing the horizontal coordinate value Xo (=Xi) by the number of pixels (M) in the grid blocks in the horizontal direction (=Xi/64). The input coordinate setting unit 113 supplies, to the coordinate calculation unit 114, the first grid block coordinates GB1 including the vertex coordinates included in the tables GTBL [Xi/64] [0], GTBL [Xi/64] [16], which have been selected using the aforementioned coordinate values.

Based on the index value Idx and the output line number SLn output from the delay line buffer selection unit 112, the input coordinate setting unit 113 supplies, to the second coordinate calculation unit 117, the second grid block coordinates GB2 including the vertex coordinates of the grid blocks including a plurality of line data pieces necessary for generating output pixels.

Based on the grid block coordinates GB1 supplied from the input coordinate setting unit 113, the first coordinate calculation unit 114 calculates the vertical correction range values VA2 in accordance with pixel positions in the horizontal direction. The coordinate calculation unit 114 outputs the calculated vertical correction range values VA2 (the minimum value Ymin and the maximum value Ymax of vertical coordinates). The vertical correction range values VA2 are supplied to the enable signal generation unit 115.

For example, an arithmetic expression used in the coordinate calculation unit 114 is expressed as the following formula 3 based on formula 2 and on the grid block coordinates GB1.

$$Yi=func(GTBL[m][n],Xo,Yo) \quad \text{(Formula 3)}$$

The coordinate calculation unit 114 calculates the minimum value Ymin and the maximum value Ymax of pixels necessary for the vertical distortion correction processing, within a range of the size of the grid blocks (the number of pixels) in the horizontal direction, and within a range of the size of image data pieces in one frame (the number of lines) in the vertical direction.

Figure 20:
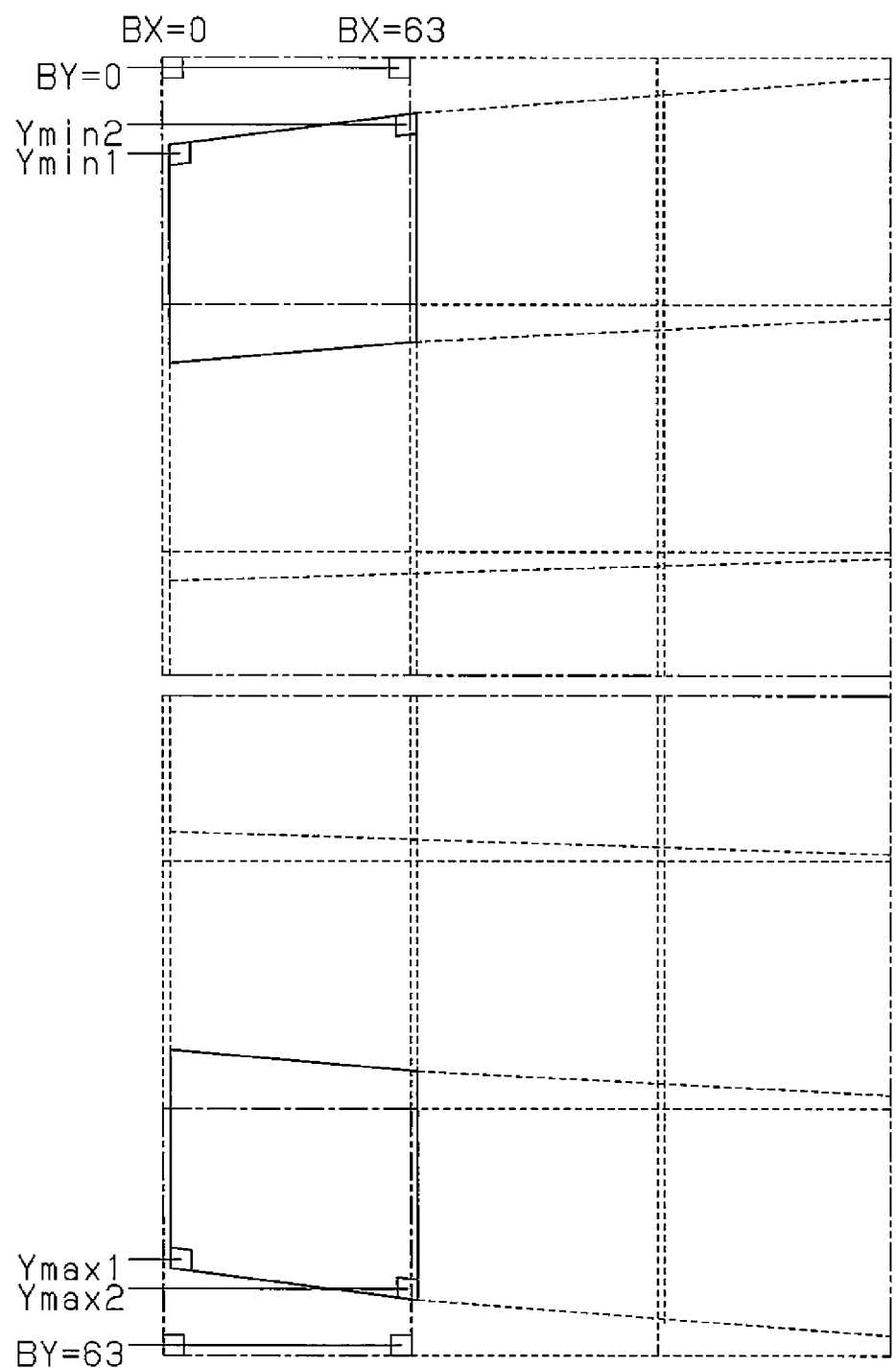
FIG. 20 is a diagram for illustrating coordinate calculation.

As illustrated in FIG. 20, with respect to the minimum value "0" of horizontal coordinates in one grid block, the coordinate value Ymin1 of input pixels necessary for generating output pixels of the first line (Yo=0) in one frame, as well as the coordinate value Ymax1 of input pixels necessary for generating output pixels of the last line (Yo=63) in one frame, are calculated. Similarly, with respect to the maximum value (e.g., "63") of horizontal coordinates in one grid block, the coordinate value Ymin2 of input pixels necessary for generating output pixels of the first line (Yo=0) in one frame, as well as the coordinate value Ymax2 of input pixels necessary for generating output pixels of the last line (Yo=63) in one frame, are calculated.

The coordinate calculation unit 114 calculates the coordinate values Ymin1, Ymin2, Ymax1, Ymax2 in accordance with formula 3 as follows.

$$Ymin1=func(GTBL[Xi/64][0],0,0)$$

$$Ymin2=func(GTBL[Xi/64][0],63,0)$$

$$Ymax1=func(GTBL[Xi/64][16],0,63)$$

$$Ymax2=func(GTBL[Xi/64][16],63,63)$$

The coordinate calculation unit 114 calculates necessary coordinate values Ymin, Ymax as follows.

$$Ymin=min(Ymin1,Ymin2)$$

$$Ymax=max(Ymax1,Ymax2)+YGof$$

Note that "max(a, b)" is a function for returning a larger one of values "a" and "b", and "min(a, b)" is a function for returning a smaller one of values "a" and "b". Also, "YGof" is a coordinate value of the origin of image data pieces in one frame, that is to say, an offset value for the entire image data pieces with respect to grid blocks. This offset value "YGof" is obtained by multiplying: the number of grid blocks from a grid block including the first line to a grid block including the last line, that is to say, a number obtained by subtracting 1 from the number of grid blocks in the vertical direction (e.g., "17"); by the number of pixels N in the grid blocks in the vertical direction (e.g., "64"). In other words, this offset value "YGof" is obtained by multiplying 16 by 64. The coordinate calculation unit 114 outputs the vertical correction range values VA2 including the calculated coordinate values (Ymin, Ymax).

The enable signal generation unit 115 outputs an enable signal DDE based on the input vertical coordinate Yi output from the input coordinate generation unit 111 and on the vertical correction range values VA2 supplied from the coordinate calculation unit 114. The vertical correction range values VA2 include the minimum value Ymin and the maximum value Ymax of coordinate values of input pixels necessary for correction. When the input vertical coordinate Yi falls between the minimum value Ymin and the maximum value Ymax (Ymin≤Yi≤Ymax), the enable signal generation unit 115 outputs an enable signal DDE of the first level (e.g., H level). When the input vertical coordinate Yi is smaller than the minimum value Ymin (Yi<Ymin) or when the input vertical coordinate Yi is larger than the maximum value Ymax (Ymax<Yi), the enable signal generation unit 115 outputs an enable signal DDE of the second level (e.g., L level) that is different from the first level.

The output coordinate generation unit 116 generates coordinate values of output pixels based on the index value Idx and the output line number SLn supplied from the delay line buffer selection unit 112. The output coordinate generation unit 116 includes a counter 116a that counts clock signals CLK. An index value Idx is a number for identifying a delay line buffer that stored pixels Ga, Gb that were output from the delay line buffer selection unit 112 to the linear interpolation unit 118. An index value Idx is equal to an integer value obtained as a result of dividing the coordinate value Xo of an output pixel by the storage capacity of a delay line buffer (the number of stored pixels) in the horizontal direction. A position Xd of each of the delay line buffers DLB [0] to DLB [119] in the horizontal direction is obtained by counting output pixels or clock signals CLK for transferring the output pixels using the counter 116a. Furthermore, necessary coordinate values are coordinate values in the grid blocks (relative coordinate values in units of grid blocks). Therefore, the output coordinate generation unit 116 calculates the coordinate value Xo of an output pixel in an image corresponding to one frame (the horizontal coordinate value) using the following expression, based on: the result of multiplying an index value Idx by the number of pixels stored in the delay line buffers DLB [0] to DLB [119] in the horizontal direction (e.g., "16"); the position Xd of each of the delay line buffers DLB [0] to DLB [119] in the horizontal direction; and the size M of the grid blocks in the horizontal direction.

$$Xo=(Idx \times 16+Xd) \% M$$

Note that "%" is an operator for calculating a remainder (remaining integer) of division of a dividend a by a divisor b as in, for example, the arithmetic expression "c=a % b".

An output line number SLn corresponds to the vertical coordinate value of an output pixel. Therefore, the output coordinate generation unit 116 calculates the coordinate value (relative coordinate value) YB of an output pixel in the grid blocks using the following expression based on the size N of the grid blocks in the vertical direction.

$$YB=SLn \% N$$

The output coordinate generation unit 116 supplies the calculated coordinate values Xo, YB to the coordinate calculation unit 117.

Similarly to the coordinate calculation unit 73 illustrated in FIG. 4, the coordinate calculation unit 117 calculates the coordinate value (input vertical coordinate) Yi of an input pixel necessary for generating an output pixel using the following expression in accordance with formula 3, based on the second grid block coordinates GB2 output from the input coordinate setting unit 113 and on the coordinate values Xo, YB of the output pixel output from the output coordinate generation unit 116.

$$Yi=\text{func}(GTBL[m][n],Xo,YB)$$

The coordinate calculation unit 117 generates an input vertical coordinate VP and an interpolation coefficient Vα corresponding to the calculated input vertical coordinate Yi. The value of the calculated input vertical coordinate Yi includes an integer portion and a decimal portion. The coordinate calculation unit 53 generates an input vertical coordinate VP with a value equal to the integer portion of the calculated input vertical coordinate Yi, and an interpolation coefficient Vα with a value equal to the decimal portion of the input vertical coordinate Yi. The input vertical coordinate VP is supplied to the delay line buffers DLB [0] to DLB [119], and the interpolation coefficient Vα is supplied to the linear interpolation unit 118.

The coordinate calculation unit 117 calculates coordinate values Ymin3, Ymax3, which indicate a range of a division line (described later) necessary for generating an output pixel, based on the second grid block coordinates GB2 output from the input coordinate setting unit 113 and on the coordinate values Xo, YB of the output pixel output from the output coordinate generation unit 116.

Figures 21, 22A, 22B:
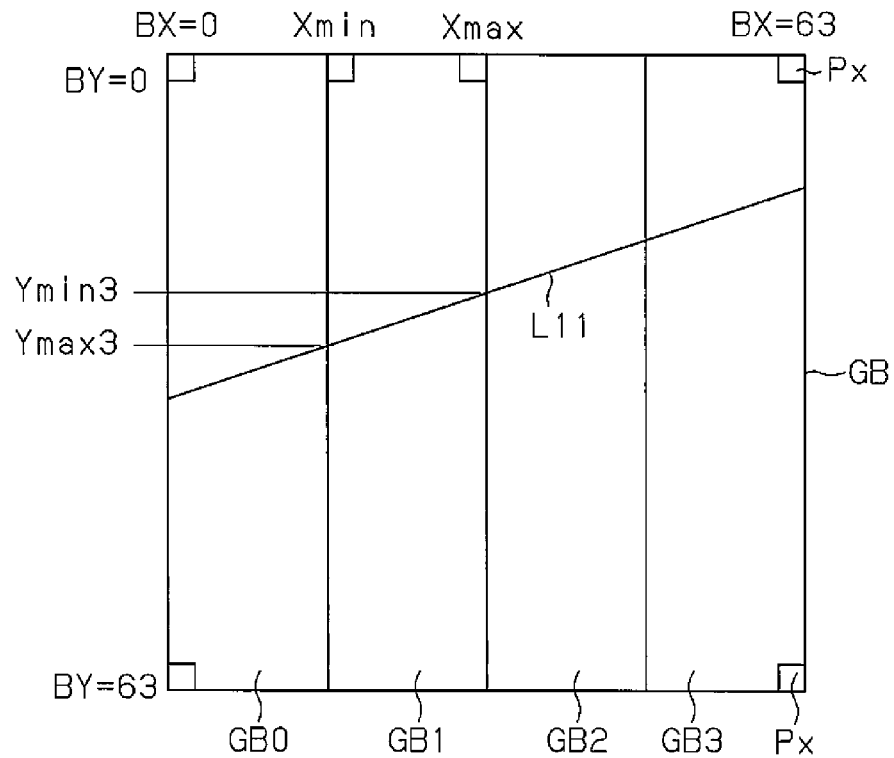
FIG. 21 is a diagram for illustrating coordinate calculation.
FIGS. 22A and 22B are diagrams for describing the operations of delay line input buffers.

FIG. 21 illustrates the coordinate values of pixels stored in four delay line input buffers and the coordinate values Ymin3, Ymax3 calculated by the coordinate calculation unit 117 with respect to one grid block GB.

One grid block GB includes pixels Px having the coordinate values BX=0 to 63, BY=0 to 63, which are based on a pixel at a predetermined position (e.g., upper left), in accordance with the number of pixels in the horizontal direction (e.g., "64") and the number of pixels in the vertical direction (e.g., "64"). Provided that the number of pixels in a delay line input buffer in the horizontal direction is, for example, "16", image data pieces of pixels in this grid block GB are stored in four delay line input buffers. For example, referring to FIG. 21, grid blocks GB0 to GB3, which have been divided in the left-right direction, are respectively stored in the delay line buffers DLB [0] to DLB [3]. A solid line 11 illustrated in FIG. 21 indicates pixels necessary for generating output pixels. The coordinate calculation unit 117 calculates the coordinate values Ymin3, Ymax3 in the delay line buffer DLB [1].

For example, the coordinate calculation unit 117 calculates the minimum value Xmin and the maximum value Xmax of horizontal coordinates in each delay line buffer using the following expressions based on the coordinate value Xo output from the output coordinate generation unit 116.

$$Xmin=(Xo/16) \times 16$$

$$Xmax=(Xo/16) \times 16+15$$

The coordinate calculation unit 117 calculates the vertical coordinates Y1, Y2 of input pixels that are necessary for coordinates having the minimum value Xmin and the maximum value Xmax using the following expressions in accordance with formula 3.

$$Y1=\text{func}(GTBL[m][n],Xmin,YB)$$

$$Y2=\text{func}(GTBL[m][n],Xmax,YB)$$

Next, the coordinate calculation unit 117 compares the calculated coordinate values Y1, Y2 with each other, and sets the coordinate values Ymin3, Ymax3 in accordance with the result of comparison. For example, the coordinate calculation unit 117 sets the coordinate values Ymin3, Ymax3 as follows: when (Y1>Y2), Ymin3=Y2 and Ymax3=Y1; when (Y1≤Y2), Ymin3=Y1 and Ymax3=Y2.

In the vertical distortion correction processing, to generate an output pixel, image data pieces of two pixels corresponding to the input coordinate values calculated based on the vertical coordinate value of the output pixel are used. The distance (movement amount) from the vertical coordinate values of these two pixels to the vertical coordinate value of the output pixel corresponds to the aberration (distortion) in the image capture optical system 11 (see FIG. 13). Therefore, movement amounts of input pixels with respect to a plurality of output pixels (e.g., 16 pixels) corresponding to one line stored in one delay line buffer vary depending on the horizontal coordinate values of output pixels.

For example, in FIG. 22A, pixels provided with numbers represent pixels necessary for generating a plurality of output pixels (eight pixels in FIGS. 22A and 22B) in one line. The number provided to each pixel indicates a "line number" and a "horizontal coordinate value". For example, "10" indicates a pixel with the line number 1 and the horizontal coordinate value "0". The vertical distortion correction unit 102 (later-described linear interpolation unit 118) generates an output pixel with the horizontal coordinate value "0" based on the input pixels "10", "20". Similarly, the vertical distortion correction unit 102 generates an output pixel with the horizontal coordinate value "1" based on the input pixels "11", "21". The vertical distortion correction unit 102 also generates an output pixel with the horizontal coordinate value "7" based on the input pixels "37", "47".

In the example illustrated in FIG. 22A, image data pieces with the line numbers 1 to 4 stored in a delay line buffer DLB (e.g., DLB [0]) are used to generate output pixels. In other words, once the image data pieces with the line numbers 1 to 4 have been stored into the delay line buffer DLB [0], image data pieces of eight pixels included in one division line can be generated. In this example, the minimum vertical coordinate value Ymin3 and the maximum vertical coordinate value Ymax3 for generating output pixels are respectively "1" and "4".

These vertical coordinate values Ymin3, Ymax3 are calculated based on vertex coordinates corresponding to a grid block including pixels of one division line.

That is to say, an index value Idx corresponds to a horizontal coordinate value of a pixel in a division line, and an output line number SLn corresponds to a vertical coordinate value of a division line. Based on these horizontal and vertical coordinate values, one grid block is selected. An index value Idx indicates the number of a delay line buffer storing an input pixel used to generate an output pixel. Each of the delay line buffers DLB [0] to DLB [119] stores a division line obtained by dividing a horizontal line into predetermined pixels (e.g., 16 pixels). The size of a grid block in the horizontal direction (the number of pixels) is, for example, 64 pixels. Therefore, a horizontal coordinate value of a grid block [BX] is obtained by multiplying an index value Idx by ¼ (=16/64). An output line number SLn is equal to a line number in an image corresponding to one frame. Therefore, a vertical coordinate value of a grid block [BY] is obtained by dividing an output line number SLn by the size of the grid block in the vertical direction (e.g., 64 pixels). That is to say, the coordinates of a grid block is (Idx×4, SLn/64). Therefore, the input coordinate setting unit 113 supplies, to the second coordinate calculation unit 117, the second grid block coordinates GB2 including the vertex coordinates included in the table GTBL [Idx×4] [SLn/64].

Input pixels necessary for generating output pixels in one division line may be included in two grid blocks. However, to obtain the numbers of lines necessary for vertical distortion correction, the use of vertex coordinates of one grid block does not give rise to any problem. The vertex coordinates included in tables corresponding to two grid blocks may be regarded as the second grid block coordinates GB2.

The linear interpolation unit 118 supplies image data Gc to the access control unit 102a, the image data Gc being generated based on the interpolation coefficient Vα output from the coordinate calculation unit 117 by applying linear interpolation to image data pieces Ga, Gb of two pixels corresponding to the vertical direction of image data pieces of two lines output from the delay line buffer selection unit 112. The linear interpolation unit 118 generates interpolated image data by, for example, applying alpha blending to image data pieces of pixels in the two lines. It will be assumed, for example, that the image data pieces (pixel values) of pixels in the first line and the second line output from the delay line buffer selection unit 112 are respectively Ga1 and Ga2. The linear interpolation unit 118 calculates image data Ga3 (Gc) of an output pixel using the following expression: Ga3=(1−Vα)·Ga1+ Vα·Ga2. The linear interpolation unit 118 outputs the generated image data (pixel value) Ga3.

The access control unit 102a includes a data buffer 121 and a transfer destination address calculation unit 122. The data buffer 121 successively stores image data pieces PD3 output from the linear interpolation unit 118. The transfer destination address calculation unit 122 calculates a transfer destination address of the memory 42 into which the image data pieces stored in the data buffer 121 are to be stored. The transfer destination address calculation unit 122 calculates a transfer destination address based on the index value Idx of a delay line buffer that outputs image data pieces used to generate corrected image data pieces stored in the data buffer 121, and on the output vertical coordinate Yo of the corrected image data pieces. The access control unit 102a supplies the transfer destination address and the corrected image data pieces to the memory 42. The memory 42 stores the image data pieces transferred from the access control unit 102a into an area corresponding to the transfer destination address.

Specifics of the delay line buffers DLB [0] to DLB [119] will be described.

Figure 15:
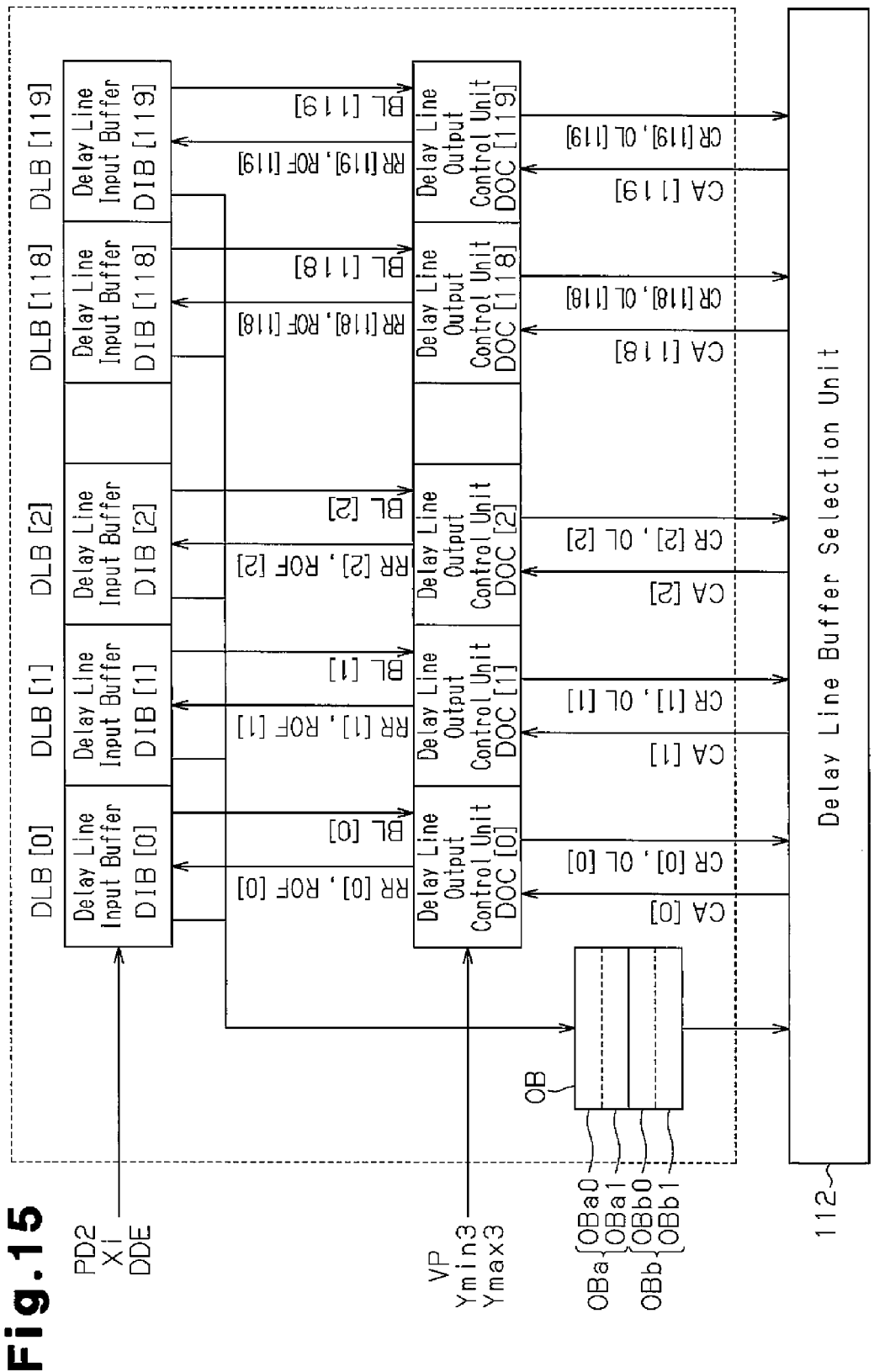
FIG. 15 is a block diagram illustrating delay line buffers.

As illustrated in FIG. 15, the delay line buffer DLB [0] includes a delay line input buffer DIB [0] and a delay line output control unit DOC [0]. Similarly, the delay line buffers DLB [1] to DLB [119] include delay line input buffers DIB [0] to DIB [119] and delay line output control units DOC [1] to DOC [119].

The delay line input buffers DIB [0] to DIB [119] store a plurality of levels of partial line data pieces, which are obtained by dividing image data pieces in one frame in the horizontal direction. A data amount of division line data pieces in one level is set according to a data amount transferred to the memory 42 illustrated in FIG. 13 through a single burst transfer. For example, image data pieces of 16 pixels are stored in one level. The number of levels of division line data pieces is set according to a movement amount in the vertical distortion correction processing.

An index value Idx is set to each of the delay line input buffers DIB [0] to DIB [119]. Each of the delay line input buffers DIB [0] to DIB [119] stores image data pieces of pixels with horizontal coordinate corresponding to the index value Idx. It will be assumed, for example, that the number of pixels in image data pieces of one frame in the horizontal direction is "1920". In this case, the index values Idx are "0" to "119". A delay line input buffer DIB with the index value Idx "0" stores image data pieces of pixels with the horizontal coordinate values "0" to "15". A delay line input buffer DIB with the index value Idx "1" stores image data pieces of pixels with the horizontal coordinate values "16" to "31". A delay line input buffer DIB with the index value Idx "119" stores image data pieces of pixels with the horizontal coordinate values "1904" to "1919".

The delay line input buffers DIB [0] to DIB [119] store image data pieces in response to an enable signal DDE of the first level (H level). An enable signal DDE is placed in the first level when the division lines stored in the delay line input buffers DIB [0] to DIB [119] include pixels necessary for the vertical distortion correction processing. Each of the delay line input buffers DIB [0] to DIB [119] stores division line data pieces including pixels with corresponding coordinate values.

The delay line input buffers DIB [0] to DIB [119] output buffer level numbers BL [0] to BL [119], which correspond to the number of levels of division lines stored. The delay line output control units DOC [0] to DOC [119] monitor the buffer level numbers BL [0] to BL [119]. When the buffer level numbers BL [0] to BL [119] become equal to the number of buffer levels that allows the vertical distortion correction processing, the delay line output control units DOC [0] to DOC [119] output calculation requests CR [0] to CR [119] to the delay line buffer selection unit 112. The delay line buffer selection unit 112 outputs calculation request acceptances CA [0] to CA [119] in response to the calculation requests CR [0] to CR [119] output from the delay line output control units DOC [0] to DOC [119]. For example, the delay line buffer selection unit 112 arbitrates the plurality of calculation requests CR, and makes effective a calculation request acceptance CA corresponding to one calculation request CR. Upon accepting the effective calculation request acceptance CA, the delay line output control units DOC [0] to DOC [119] output read requests RR [0] to RR [119] and read offset values ROF [0] to ROF [119] to the delay line input buffers DIB [0] to DIB [119]. Based on the read requests RR [0] to RR [119] and the read offset values ROF [0] to ROF [119], the delay line input buffers DIB output image data pieces necessary for the vertical distortion correction processing.

An output buffer OB may include, for example, two buffer units OBa, OBb. Each of the buffer units OBa, OBb stores image data pieces of two division lines. The output buffer OB alternately performs writing and reading of data pieces with respect to the buffer units OBa, OBb. For example, the output buffer OB stores image data pieces output from one delay line input buffer into the first buffer unit OBa. When reading image data pieces from the first buffer unit OBa, the output buffer OB writes image data pieces into the second buffer unit OBb. The delay line buffer selection unit 112 supplies image data pieces output from the output buffer OB to the linear interpolation unit 118 illustrated in FIG. 14.

A description is now given of the delay line input buffer DIB [0]. The delay line input buffers DIB [1] to DIB [119] are the same as the delay line input buffer DIB [0], and therefore a drawing and description of the delay line input buffers DIB [1] to DIB [119] are omitted.

Figure 16:
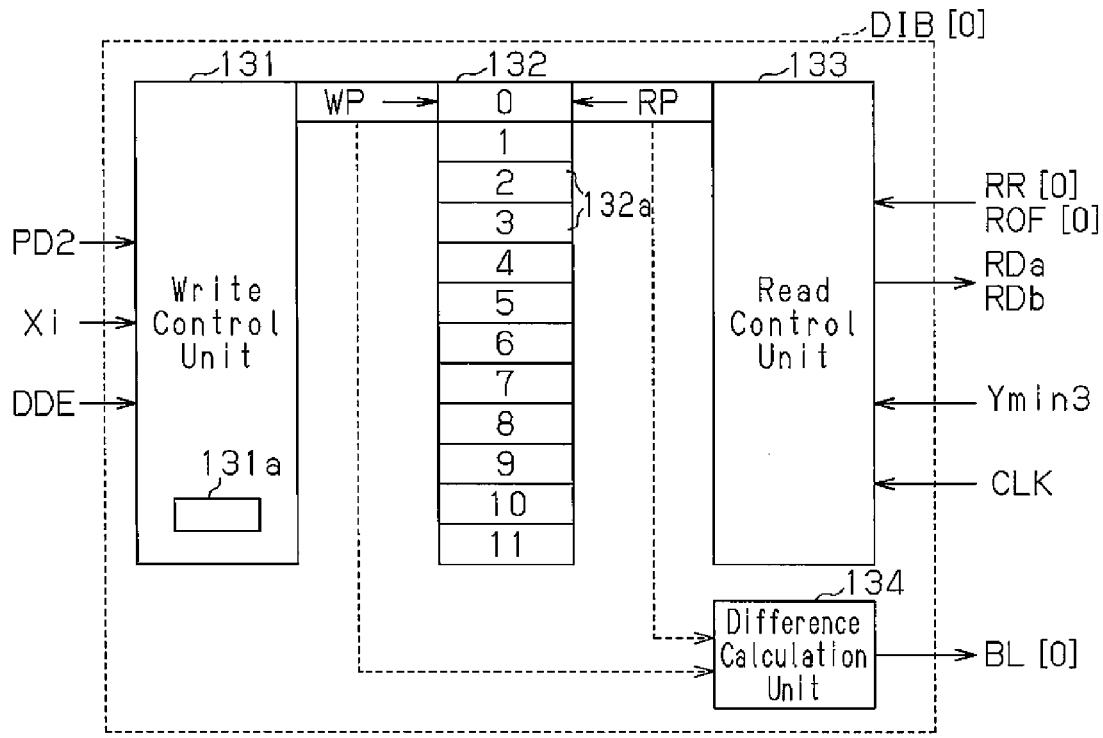
FIG. 16 is a block diagram illustrating delay line input buffers.

As illustrated in FIG. 16, the delay line input buffer DIB [0] includes a write control unit 131, a memory array 132, a read control unit 133, and a difference calculation unit 134.

The memory array 132 includes a plurality of levels of line memories 132a (12 levels in the figure). The storage capacity of each line memory 132a is set to a value corresponding to a transfer amount for the memory 42 illustrated in FIG. 13 through a single burst transfer. For example, the storage capacity of each line memory 132a is set to allow storage of image data pieces of 16 pixels. The number of levels in the memory array 132, namely the number of the line memories 132a (the number of lines) is set in correspondence with a vertical movement amount in the vertical distortion correction processing.

Image data pieces PD2 and an input horizontal coordinate Xi corresponding to these image data pieces PD2 are supplied to the write control unit 131. An enable signal DDE is also supplied to the write control unit 131.

The write control unit 131 includes a register 131a. The register 131a stores the index value Idx of the delay line input buffer DIB.

The write control unit 131 executes write processing with respect to the memory array 132 in response to an enable signal DDE of the first level (H level), and does not execute write processing in response to an enable signal DDE of the second level (L level). In the write processing, the write control unit 131 determines whether or not the image data pieces PD2 correspond to the delay line input buffer DIB [0] based on the input horizontal coordinate Xi and the index value Idx. For example, the write control unit 131 divides the input horizontal coordinate Xi by the number of horizontal pixels corresponding to the storage capacity of the memory array 132 (e.g., 16 pixels), and compares an integer value obtained as a result of this calculation with the index value Idx. If the integer value obtained as a result of the calculation is equal to the index value Idx, the write control unit 131 determines that the image data pieces PD2 are of pixels corresponding to the buffer DIB [0]. If the integer value is not equal to the index value Idx, the write control unit 131 determines that the image data pieces PD2 are of pixels that do not correspond to the buffer DIB [0]. If the write control unit 131 determines that the image data pieces PD2 are of pixels corresponding to the buffer DIB [0], it stores the image data pieces PD2 into an area corresponding to the input horizontal coordinate Xi in a line memory indicated by the write pointer WP. For example, the write control unit 131 applies remainder calculation to the input horizontal coordinate Xi using the index value Idx, regards a value obtained as a result of the remainder calculation as an address in each line memory 132a (X-address), and stores the image data pieces PD2 into the X-address. Upon storing the last image data piece into each line memory 132a, the write control unit 131 updates the write pointer WP (+1).

In the above manner, the write control unit 131 successively stores image data pieces of a plurality of pixels corresponding to the index value Idx of the buffer DIB [0] into the line memories 132a in accordance with the write pointer WP. The write control unit 131 resets the write pointer WP in accordance with the number of levels in the memory array 132. In FIG. 16, the memory array 132 includes 12 levels of line memories 132a. Once the write control unit 131 has stored division line data pieces into the line memory 132a of the 12$^{th}$ level in accordance with the write pointer WP with the value "11", the write control unit 131 resets the value of the write pointer WP (=0).

A read request RR [0], a read offset value ROF [0], and the vertical coordinate value Ymin3 are supplied to the read control unit 133. The read control unit 133 counts clock signals CLK in response to the read request RR [0], and uses the counted value as the X-address. The read control unit 133 reads image data pieces necessary for the vertical distortion correction processing from a line memory 132a in the memory array 132 based on the X-address, the read pointer RP, the vertical coordinate value Ymin3, and the read offset value ROF [0], and supplies the read image data pieces to the output buffer OB.

For example, the read control unit 133 generates a first read address by adding the read offset value ROF [0] to the address indicated by the read pointer RP. The read control unit 133 reads image data pieces stored in an area indicated by the X-address in the line memory indicated by the first read address, and outputs first read data pieces RDa equivalent to the read image data pieces. Furthermore, the read control unit 133 generates a second read address by adding a predetermined value (e.g., "1") to the first read address. The read control unit 133 reads image data pieces stored in an area indicated by the X-address in the line memory indicated by the second read address, and outputs second read data pieces RDb equivalent to the read image data pieces.

Once the read control unit 133 has finished the read processing in response to the read request RR [0], the read control unit 133 controls the read pointer RP in the next cycle based on the read pointer RP and the vertical coordinate value Ymin3. For example, the read control unit 133 calculates a difference value ΔY between the vertical coordinate value Ymin3 and the read pointer RP. The read control unit 133 adds the difference value ΔY to the read pointer RP, and uses the result of the addition as a new read pointer RP. The read control unit 133 resets a counter value for generating the X-address.

The difference calculation unit 134 calculates a value of a difference between the write pointer WP and the read pointer RP, and outputs this difference value BL [0]. The write pointer WP indicates a line memory into which image data pieces are to be written next, and the read pointer RP indicates a line memory corresponding to the minimum coordinate value (vertical coordinate value Ymin3) in a range of pixels that are necessary for the next vertical distortion correction processing. Therefore, the difference value BL [0] between the write pointer WP and the read pointer RP indicates the number of levels of line memories in which image data pieces are stored, that is to say, the number of lines stored in the delay line input buffers with respect to an image corresponding to one frame. The difference value BL [0] is supplied to the delay line output control unit DOC illustrated in FIG. 15. When the difference value BL [0] becomes equal to the number of levels necessary for the vertical distortion correction processing, the delay line output control unit DOC outputs a read request RR [0] to the delay line input buffer DIB.

A description is now given of the reading operations in the delay line input buffer DIB [0].

Figure 17:
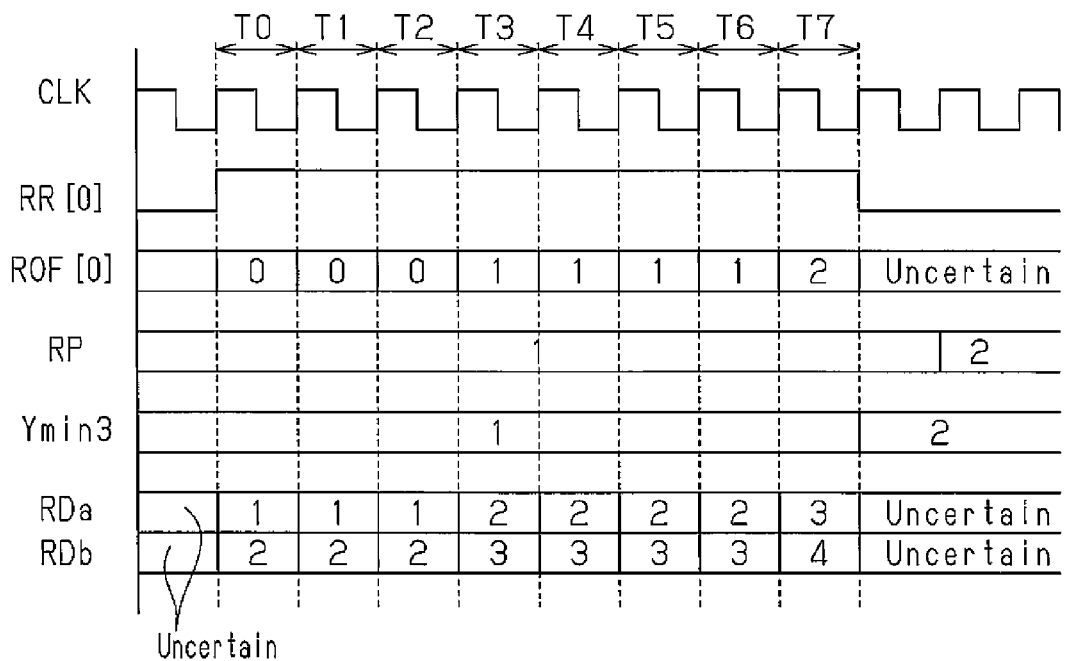
FIG. 17 is a timing chart illustrating operations of a delay line input buffer.

FIG. 17 illustrates the case where image data pieces of pixels illustrated in FIG. 22A are read. In this case, the storage capacity of the line memories 132a illustrated in FIG. 13 corresponds to eight pixels. The image data pieces RDa, RDb illustrated in FIG. 17 indicate the level numbers of line memories from which these image data pieces RDa, RDb were read.

It will be assumed, for example, that the read pointer RP is "1" and the vertical coordinate value Ymin3 is "1".

Once a read request RR [0] of the H level has been supplied, counting of clock signals CLK is started. In the first cycle T0, in accordance with the first read address obtained by adding the read offset value ROF [0] (=0) to the read pointer RP, image data pieces at the X-address (=0) in the line memory 132a of "1" are read and output as the first read data pieces RDa. Similarly, in accordance with the second read address obtained by adding the read offset value ROF [0] and "1" to the read pointer RP, image data pieces at the X-address (=0) in the line memory 132a of "2" are read and output as the second read data pieces RDb.

Similarly to the first cycle T0, in the second cycle T1 and the third cycle T2, image data pieces at the X address (=1, 2) are read from the line memories 132a of "1" and "2", and successively output as the first read data pieces RDa and the second read data pieces RDb.

Thereafter, in the fourth to seventh cycles T3 to T6, in accordance with the first read address obtained by adding the read offset value ROF [0] (=1) to the read pointer RP, image data pieces at the X-address (=3 to 6) in the line memory 132a of "2" are read and successively output as the first read data pieces RDa. Similarly, in accordance with the second read address obtained by adding the read offset value ROF [0] and "1" to the read pointer RP, image data pieces at the X-addresses (=3 to 6) in the line memory 132a of "3" are read and successively output as the second read data pieces RDb.

In the eighth cycle T7, in accordance with the first read address obtained by adding the read offset value ROF [0] (=2) to the read pointer RP, image data pieces at the X-address (=7) in the line memory 132a of "3" are read and output as the first read data pieces RDa. Similarly, in accordance with the second read address obtained by adding the read offset value ROF [0] and "1" to the read pointer RP, image data pieces at the X-address (=7) in the line memory 132a of "4" are read and output as the second read data pieces RDb.

FIGS. 22A and 22B illustrate pixels that have been read from the memory array 132 in accordance with the timing chart illustrated in FIG. 17, and pixels stored in the output buffer OB (first buffer unit OBa). The first area OBa0 in the output buffer OB (OBa) stores pixels "10" to "12", "23" to "26", and "37". The second area OBa1 in the output buffer OB (OBa) stores pixels "20" to "22", "33" to "36", and "47". Therefore, in the output buffer OB (OBa), image data pieces of pixels with different vertical coordinate values are stored in one area OBa0 (OBa1) as illustrated in FIG. 22B. The vertical distortion correction processing can be executed by successively reading image data pieces in these areas OBa0, OBa1.

The delay line output control unit DOC [0] will be described. The delay line output control units DOC [1] to DOC [119] are the same as the delay line output control unit DOC [0], and therefore a drawing and description of the delay line output control units DOC [1] to DOC [119] are omitted.

Figure 18:
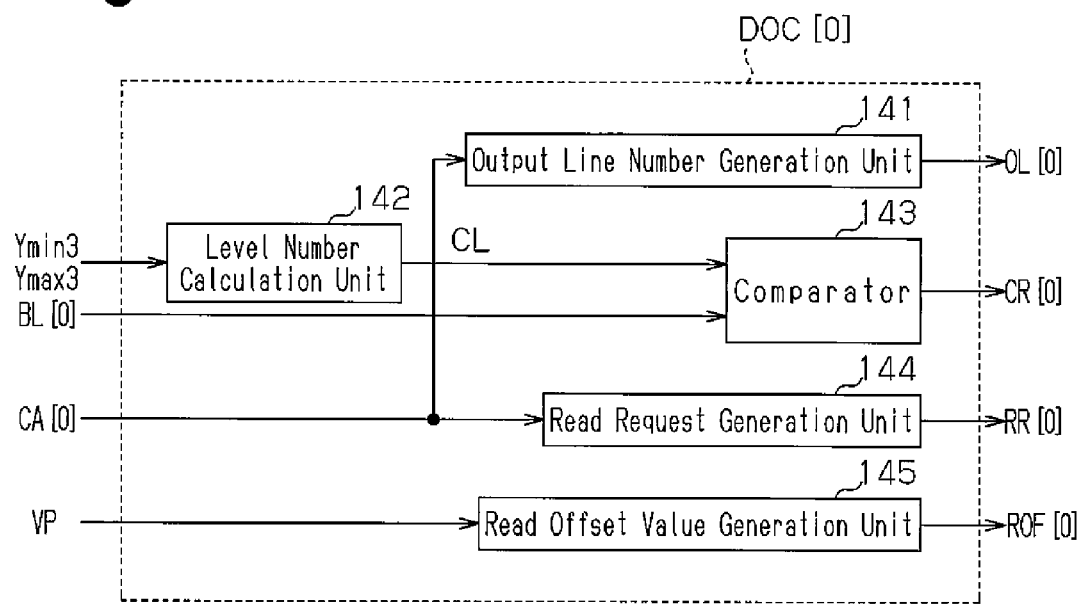
FIG. 18 is a block diagram illustrating a delay line output control unit.

As illustrated in FIG. 18, the delay line output control unit DOC [0] includes an output line number generation unit 141, a level number calculation unit 142, a comparator 143, a read request generation unit 144, and a read offset value generation unit 145.

The output line number generation unit 141 monitors the read request RR [0], and outputs the output line number OL [0] in accordance with the monitoring result. For example, the output line number generation unit 141 counts read requests, and outputs the counted value as the output line number OL [0]. The output line number generation unit 141 increments the counted value (+1) in response to the read request RR [0] of a predetermined level (e.g., H level). Upon completion of the reading of image data pieces in a corresponding division line from the delay line input buffer DIB, the read request is withdrawn, e.g., switches from the H level to the L level. The completion of the reading of image data pieces is determined upon, for example, output of read offset values ROF [0] corresponding in number to pixels in the division line. Once the read request RR [0] has been withdrawn, the output line number generation unit 141 increments the counted value, i.e., the output line number OL [0] (+1).

The level number calculation unit 142 calculates a calculation-required level number CL in the vertical distortion correction processing. The vertical coordinate values Ymin3, Ymax3 are supplied from the second coordinate calculation unit 117 illustrated in FIG. 14 to the level number calculation unit 142. The level number calculation unit 142 calculates a value of a difference between the vertical coordinate values Ymin3 and Ymax3. This difference value is the number of levels (the number of lines) necessary for calculating image data pieces of the next line, that is to say the calculation-required level number CL.

The comparator 143 compares the calculation-required level number CL calculated by the level number calculation unit 142 with the buffer level number BL [0] output from the delay line input buffer DIB. When the buffer level number BL [0] is larger than or equal to the calculation-required level number CL, the comparator 143 outputs the calculation request CR [0]. The calculation request CR [0] is supplied to the delay line output control unit DOC illustrated in FIG. 15. Upon accepting the calculation request CR [0], the delay line output control unit DOC outputs a calculation request acceptance CA [0].

The read request generation unit 144 outputs the read request RR [0] in response to the calculation request acceptance CA [0] supplied from the delay line output control unit DOC illustrated in FIG. 15.

An input vertical coordinate VP is supplied to the read offset value generation unit 145. The read offset value generation unit 145 stores the supplied input vertical coordinate VP as a default value. The read offset value generation unit 145 outputs a difference between an input vertical coordinate VP input in synchronization with a clock signal CLK and the default value (=VP−default value) as the read offset value ROF [0].

The delay line output control unit DOC will be described.

Figure 19:
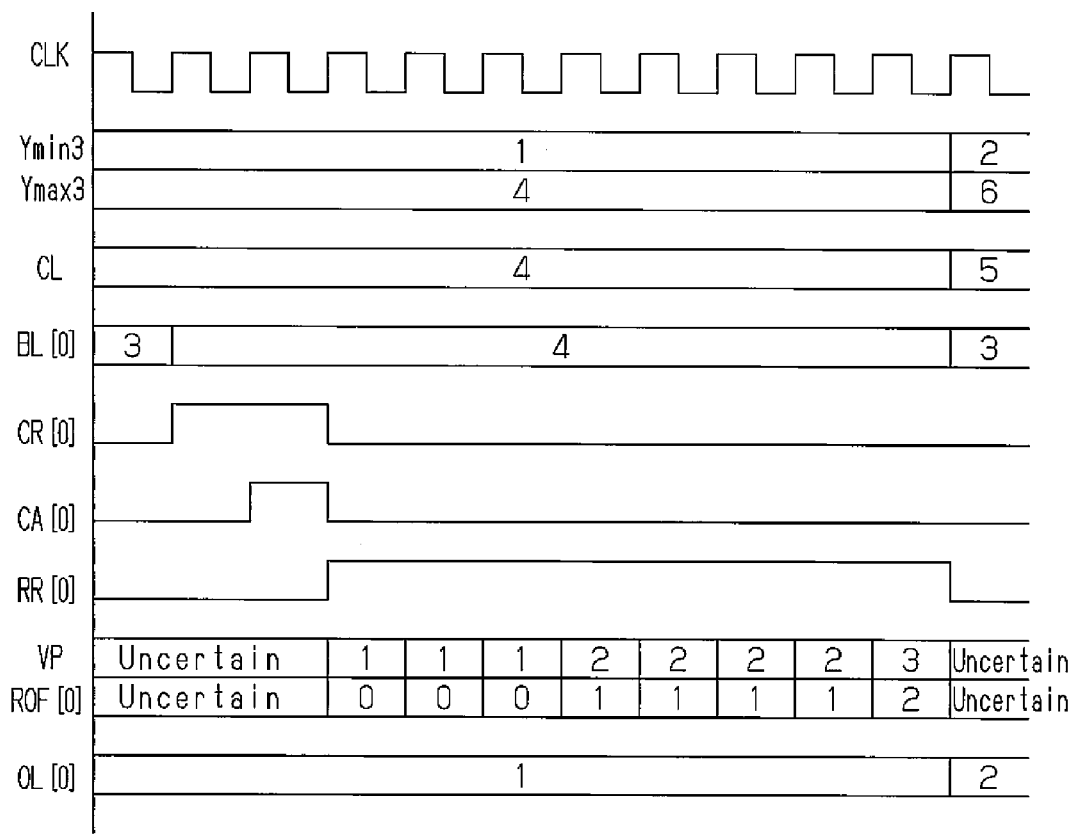
FIG. 19 is a timing chart illustrating operations of the delay line output control unit.

It will be assumed that the vertical coordinate value Ymin3 is "1" and the vertical coordinate value Ymax3 is "4" as illustrated in FIG. 19. In this case, the calculation-required level number CL is "4" (=4−1+1). Once the buffer level number BL [0] has changed from "3" to "4", a calculation request CR [0] of the H level is output. In response to the calculation request CR [0] of the H level, the delay line buffer selection unit 112 illustrated in FIG. 15 outputs a calculation request acceptance CA [0] of the H level. In response to this calculation request acceptance CA [0] of the H level, a read request RR [0] of the H level is output.

Then, when an input vertical coordinate VP is supplied, this input vertical coordinate VP is stored as a default value VPi. A read offset value ROF [0], which corresponds to the result of calculating a difference between an input vertical coordinate VP and the default value VPi, is output.

Once data pieces corresponding to the number of pixels in a division line (eight pixels in FIG. 19) have been read from the delay line input buffer illustrated in FIG. 16, a read request RR [0] of the L level is output. The output line number OL [0] is incremented (+1) in response to the falling edge of this read request RR [0], that is to say, the read request RR [0] of the L level. Also, the vertical coordinate values Ymin3, Ymax3 are updated.

A description is now given of the operations in the second embodiment.

The horizontal distortion correction unit 101a outputs image data pieces PD2 generated by the linear interpolation unit 57. The vertical distortion correction unit 102 stores the image data pieces PD2, which have been output from the horizontal distortion correction unit 101a, to the delay line buffers DLB [0] to DLB [119]. The linear interpolation processing is applied to image data pieces read from the delay line buffers DLB [0] to DLB [119], and the resultant image data pieces are stored into the memory 42. Therefore, the memory 42 is not accessed between the horizontal distortion correction and the vertical distortion correction.

Based on the grid block coordinates GB1 supplied from the input coordinate setting unit 113, the first coordinate calculation unit 114 calculates the vertical correction range values VA2 in accordance with pixel positions in the horizontal direction. The enable signal generation unit 115 outputs an enable signal DDE based on the input vertical coordinate Yi output from the input coordinate generation unit 111 and on the vertical correction range values VA2 supplied from the coordinate calculation unit 114. Based on the enable signal DDE, each of the delay line buffers DLB [0] to DLB [119] stores image data pieces PD2 with corresponding coordinates Xi, Yi.

Based on the buffer level numbers BL [0] to BL [119] corresponding to the stored division lines, the delay line buffers DLB [0] to DLB [119] output the calculation requests CR [0] to CR [119] and the output line numbers OL [0] to OL [119]. The delay line buffers DLB [0] to DLB [119] reset the calculation requests CR [0] to CR [119] in response to the calculation request acceptances CA [0] to CA [119] output from the delay line buffer selection unit 112, and successively output image data pieces of pixels included in lines necessary for the vertical distortion correction processing. In this way, distortion correction processing is executed in order, starting from the delay line buffer DLB in which necessary image data pieces are stored.

The following advantages are achieved in the second embodiment.

(2-1) The horizontal distortion correction unit 101a outputs image data pieces PD2 generated by the linear interpolation unit 57. The vertical distortion correction unit 102 stores the image data pieces PD2, which have been output from the horizontal distortion correction unit 101a, to the delay line buffers DLB [0] to DLB [119]. The linear interpolation processing is applied to image data pieces read from the delay line buffers DLB [0] to DLB [119], and the resultant image data pieces are stored into the memory 42. This makes it possible to reduce the number of times the memory 42 is accessed compared to the case where image data pieces after the horizontal distortion correction are stored into the memory 42. As a result, a time period required for the distortion correction processing can be reduced.

(2-2) Each of the delay line buffers DLB [0] to DLB [119] stores image data pieces PD2 based on an enable signal DDE. This enable signal DDE is generated based on the vertical correction range values VA2, which have been generated by the coordinate calculation unit 114 with respect to the coordinate values of the input image data pieces PD2. Based on the grid block coordinates GB1 supplied from the input coordinate setting unit 113, the coordinate calculation unit 114 calculates the vertical correction range values VA2 in accordance with pixel positions in the horizontal direction. Therefore, each of the delay line buffers DLB [0] to DLB [119] stores image data pieces of pixels that are necessary for the vertical distortion correction. As image data pieces that are unnecessary for distortion correction are not stored in the delay line buffers DLB [0] to DLB [119], the delay line buffers DLB [0] to DLB [119] with a small capacity can be used. This makes it possible to suppress an increase in the circuit scale of the vertical distortion correction unit 102, and makes it easy to mount the vertical distortion correction unit 102.

The following describes a third embodiment with reference to FIGS. 23 to 25B.

In the third embodiment, components that are the same as those in the first embodiment and the second embodiment are given the same reference signs thereas, and all or a part of a description thereof is omitted.

Figure 23:
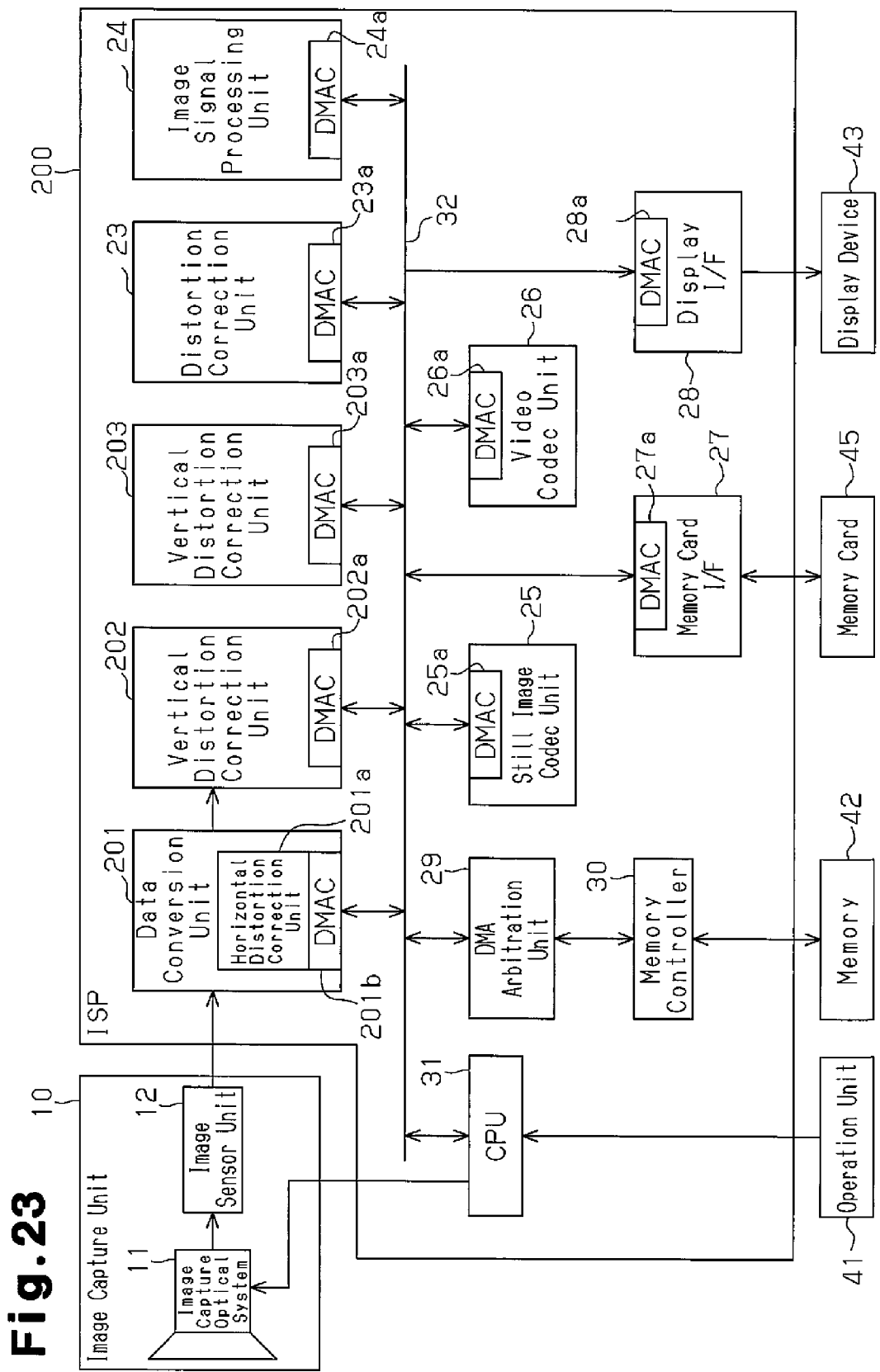
FIG. 23 is a schematic block diagram illustrating an image capture device according to a third embodiment.

As illustrated in FIG. 23, an image capture device includes an image capture unit 10, an image signal processor 200, an operation unit 41, a memory 42, and a display device 43.

The image signal processor 200 includes a data conversion unit 201, a first vertical distortion correction unit 202, a second vertical distortion correction unit 203, a distortion correction unit 23, an image signal processing unit 24, a still image codec unit 25, a video codec unit 26, a memory card I/F 27, a display I/F 28, a DMA arbitration unit 29, a memory controller 30, and a CPU 31. The data conversion unit 201 includes a horizontal distortion correction unit 201a and an access control unit 201b. The first vertical distortion correction unit 202 includes an access control unit 202a, and the second vertical distortion correction unit 203 includes an access control unit 203a. The vertical distortion correction unit 202 is one example of a second distortion correction unit and a second correction unit. The vertical distortion correction unit 203 is one example of a second distortion correction unit and a second correction unit.

The configuration of the first vertical distortion correction unit 202 is similar to the configuration of the vertical distortion correction unit 102 illustrated in FIG. 13. The configuration of the second vertical distortion correction unit 203 is similar to the configuration of the vertical distortion correction unit 22 illustrated in FIG. 1. A processing range is set for each of the first vertical distortion correction unit 202 and the second vertical distortion correction unit 203. Each of the first vertical distortion correction unit 202 and the second vertical distortion correction unit 203 applies vertical distortion correction processing to pixels included in the set processing range, and stores processed image data pieces into the memory 42.

The first vertical distortion correction unit 202 determines whether or not image data pieces output from the horizontal distortion correction unit 101a fall within the set first processing range. The first vertical distortion correction unit 202 applies the vertical distortion correction processing to image data pieces that fall within the set first processing range, and stores the processed image data pieces into the memory 42. The first vertical distortion correction unit 202 also stores image data pieces that do not fall within the set first processing range into the memory 42.

The second vertical distortion correction unit 203 accesses the memory 42, reads image data pieces corresponding to the set second processing range, and applies the vertical distortion correction processing to the read image data pieces. The second vertical distortion correction unit 203 stores the processed image data pieces into the memory 42.

A processing range is set according to, for example, a movement amount of pixels in the vertical distortion correction processing.

Figure 24A:
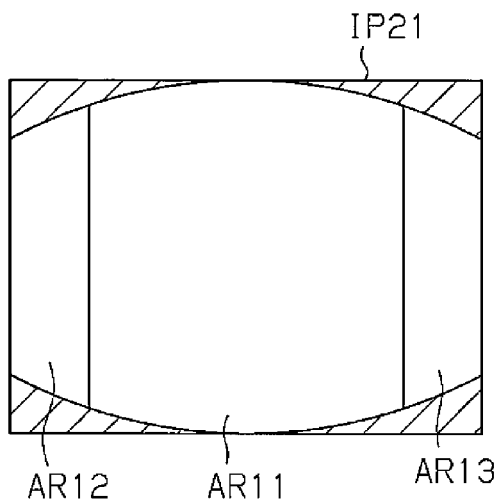
FIGS. 24A and 24B are diagrams for describing the settings for processing ranges.
Figure 24B:
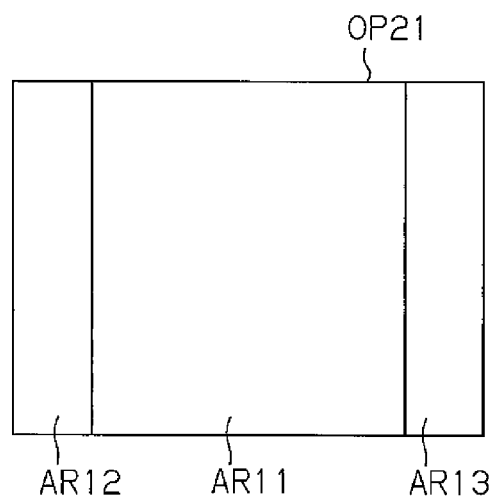

FIGS. 24A and 24B respectively illustrate image data pieces IP21 and OP21 after applying the horizontal distortion correction processing and the vertical correction processing to barrel-shaped distortion. In the image data pieces IP21 illustrated in FIG. 24A, the portions that are not hatched represent an area including pixels necessary for the vertical distortion correction processing. In the case of these image data pieces IP21, a movement amount of pixels near the center in the horizontal direction is smaller than a movement amount of pixels near the left and right edges. Therefore, a processing range AR11 including the central portion in the horizontal direction is set as the first processing range in the first vertical distortion correction unit 202, and processing ranges AR12, AR13 at the left and right edges are set as the second processing ranges in the second vertical distortion correction unit 203. The storage capacity of the internal buffer 74 included in the first vertical distortion correction unit 202 (the number of stored lines) is set according to a movement amount of pixels. Therefore, by setting the processing range AR11 with a small movement amount in the first vertical distortion correction unit 202, the storage capacity of the internal buffer 74 can be reduced. This makes it possible to suppress an increase in the area of the first vertical distortion correction unit 202 in the image processing device, and makes it easy to mount the first vertical distortion correction unit 202. The processing ranges AR11 to AR13 are examples of the first area.

Figure 25A:
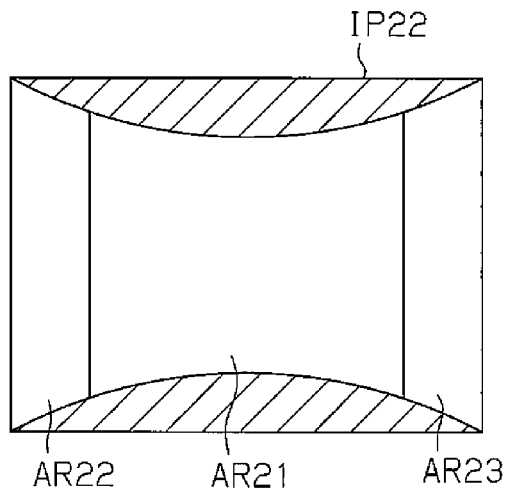
FIGS. 25A and 25B are diagrams for describing the settings for processing ranges.
Figure 25B:
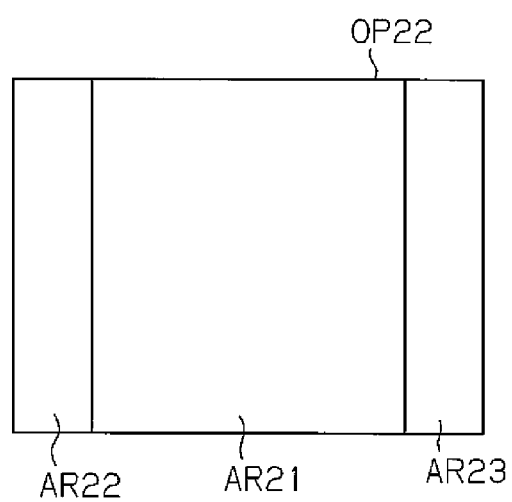

FIGS. 25A and 25B respectively illustrate image data pieces IP22 and OP22 after applying the horizontal distortion correction processing and the vertical correction processing to spool-shaped distortion. In the image data pieces IP21 illustrated in FIG. 25A, the portions that are not hatched represent an area including pixels necessary for the vertical distortion correction processing. In the case of these image data pieces IP22, a movement amount of pixels near the center in the horizontal direction is larger than a movement amount of pixels near the left and right edges. Therefore, processing ranges AR22, AR23 at the left and right edges are set as the first processing ranges in the first vertical distortion correction unit 202, and a processing range AR21 including the central portion in the horizontal direction is set as the second processing range in the second vertical distortion correction unit 203. By thus setting the processing ranges AR22, AR23 with a small movement amount in the first vertical distortion correction unit 202, the storage capacity of the internal buffer 74 can be reduced. This makes it possible to suppress an increase in the area of the first vertical distortion correction unit 202 in the image processing device, and makes it easy to mount the first vertical distortion correction unit 202. The processing ranges AR21 to AR23 are examples of the first area.

When applying the distortion correction processing to an image distorted into the shape of a spool, there are cases where the size of an output image (the number of pixels) may be smaller than the size of an input image. In this case, contrary to the image data pieces IP22 illustrated in FIG. 25A, a movement amount of pixels near the center in the horizontal direction is smaller than a movement amount of pixels near the left and right edges. In this processing, similarly to settings for the processing ranges with respect to the barrel-shaped distortion illustrated in FIGS. 24A and 24B, the processing range AR21 including the central portion in the horizontal direction is set as the first processing range in the first vertical distortion correction unit 202, and processing ranges AR22, AR23 at the left and right edges are each set as the second processing ranges in the second vertical distortion correction unit 203. By setting the processing ranges in the above manner, the storage capacity of the internal buffer 74 can be reduced similarly to the above-described processing.

A description is now given of the operations in the third embodiment.

A processing range is set for each of the first vertical distortion correction unit 202 and the second vertical distortion correction unit 203. Each of the first vertical distortion correction unit 202 and the second vertical distortion correction unit 203 applies the vertical distortion correction processing to pixels included in the set processing range, and stores processed image data pieces into the memory 42.

For example, by setting an area including pixels with a large movement amount in the second vertical distortion correction unit 203, the amount of image data pieces stored into the first vertical distortion correction unit 202 is reduced, and therefore delay line buffers DLB with a small capacity can be used.

The following advantages are achieved in the third embodiment.

(3-1) A processing range is set in each of the first vertical distortion correction unit 202 and the second vertical distortion correction unit 203. Each of the first vertical distortion correction unit 202 and the second vertical distortion correction unit 203 applies the vertical distortion correction processing to pixels included in the set processing range, and stores processed image data pieces into the memory 42. For example, by setting an area including pixels with a large movement amount in the second vertical distortion correction unit 203, the amount of image data pieces stored into the first vertical distortion correction unit 202 is reduced, and therefore the delay line buffers DLB with a small capacity can be used. This makes it possible to suppress an increase in the circuit scale of the vertical distortion correction unit 202, and makes it easy to mount the vertical distortion correction unit 202.

It should be apparent to those skilled in the art that the present invention may be embodied in many other specific forms without departing from the spirit or scope of the invention. Particularly, it should be understood that the present invention may be embodied in the following forms.

In the horizontal distortion correction unit 21a illustrated in FIG. 2, the read unit 56 may control the read pointer in the FIFO memory 55. For example, the read unit 56 may include a register for storing the input horizontal coordinate HP and a read position. When starting to read pixels in one line, the read unit 56 resets the read position of the register (=0). Once image data pieces of two or more pixels have been stored into the FIFO memory 55, the write unit 54 starts the read processing.

First, the read unit 56 stores the input horizontal coordinate HP supplied from the coordinate calculation unit 53 into the register. The read unit 56 supplies a read pointer with a value equal to the read position that has been read from the register to the FIFO memory 55, and reads image data of one pixel from the FIFO memory 55. The read unit 56 also supplies a read pointer equal to a value obtained by adding a predetermined value ("1") to the value of the read position to the FIFO memory 55, and reads image data of one pixel from the FIFO memory 55. In this way, the read unit 56 reads image data pieces of two consecutive pixels from the FIFO memory 55.

Next, the read unit 56 compares the input horizontal coordinate HP supplied from the coordinate calculation unit 53 with the input horizontal coordinate read from the register. If the input horizontal coordinate HP is equal to the input horizontal coordinate read from the register, the read unit 56 reads image data pieces of two pixels from the FIFO memory 55 in accordance with the read position stored in the register. On the other hand, if the input horizontal coordinate HP is different from the input horizontal coordinate read from the register, the read unit 56 updates the read position of the register (+1). The read unit 56 reads image data pieces of two pixels from the FIFO memory 55 in accordance with the updated read position.

In the access control unit 21b illustrated in FIG. 2, the buffer 58 may be controlled such that image data pieces of pixels that are unnecessary for the vertical distortion correction unit 22 are not stored into the buffer 58.

The size of each grid block (the number of pixels in the horizontal direction x the number of pixels in the vertical direction) may be changed as appropriate. For example, the number of pixels in each grid block may be equal to the number of pixels stored in each of the delay line buffers DLB [0] to DLB [119] in the horizontal direction. The number of pixels in each grid block may be set to the integer multiple (e.g., double) of the number of pixels stored in each of the delay line buffers DLB [0] to DLB [119] in the horizontal direction.

In the third embodiment, a processing range may be set in the horizontal distortion correction unit 101a.

For example, a first processing range is set in the horizontal distortion correction unit 101a. With regard to image data pieces after the horizontal distortion correction processing, the horizontal distortion correction unit 101a supplies image data pieces that are included in the first processing range to the first vertical distortion correction unit 202, and stores image data pieces that are not included in the first processing range into the memory 42. A second processing range may be set in the horizontal distortion correction unit 101a. In this case, with regard to image data pieces after the horizontal distortion correction processing, the horizontal distortion correction unit 101a stores image data pieces that are included in the second processing range into the memory 42, and supplies image data pieces that are not included in the second processing range to the first vertical distortion correction unit 202.

In each embodiment, the format of data transfer and the format of image data pieces stored into the memory 42 may be changed as appropriate.

Figure 26A:
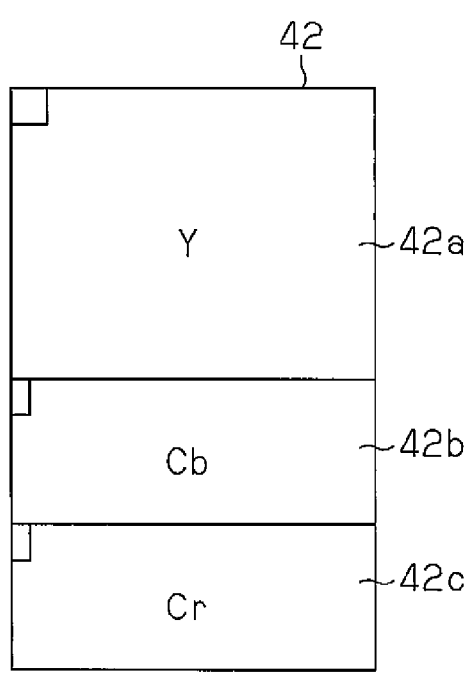
FIGS. 26A and 26B illustrate the stored states of image data pieces in a memory.
Figure 26B:
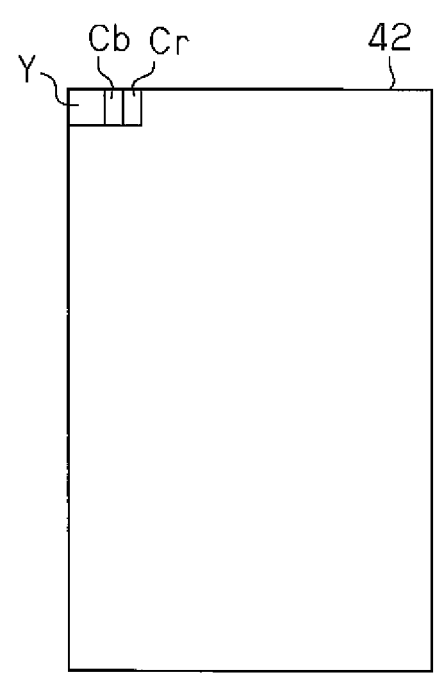

For example, FIG. 26A illustrates image data pieces that are stored into the memory 42 in accordance with a frame sequential format, and FIG. 26B illustrates image data pieces that are stored into the memory 42 in accordance with a dot sequential format. As illustrated in FIG. 26A, in the memory 42, luma information pieces Y corresponding to one frame are stored into a first area 42a, color difference information pieces Cb corresponding to one frame are stored into a second area 42b, and color difference information pieces Cr corresponding to one frame are stored into a third area 42c. FIG. 26A illustrates a luma information piece Y and color difference information pieces Cb, Cr corresponding to one pixel stored in the areas 42a to 42c.

As illustrated in FIG. 26B, in the case of the dot sequential format, a luma information piece Y and color difference information pieces Cb, Cr for each pixel are successively stored into the memory 42. FIG. 26B illustrates a luma information piece Y and color difference information pieces Cb, Cr for one pixel.

It will be assumed, for example, that the data amount of a luma information piece Y is 8 bits (1 byte), and the data amounts of the color difference information pieces Cb, Cr are 4 bits (0.5 bytes) each. It will be also assumed that a data amount of a single transfer to the memory 42 is 16 bytes. In the case of the frame sequential format illustrated in FIG. 26A, luma information pieces Y of 16 pixels are transferred through a single access. On the other hand, in the case of the dot sequential format illustrated in FIG. 26B, luma information pieces Y and color difference information pieces Cb, Cr of eight pixels are transferred through a single access.

Figure 27A:
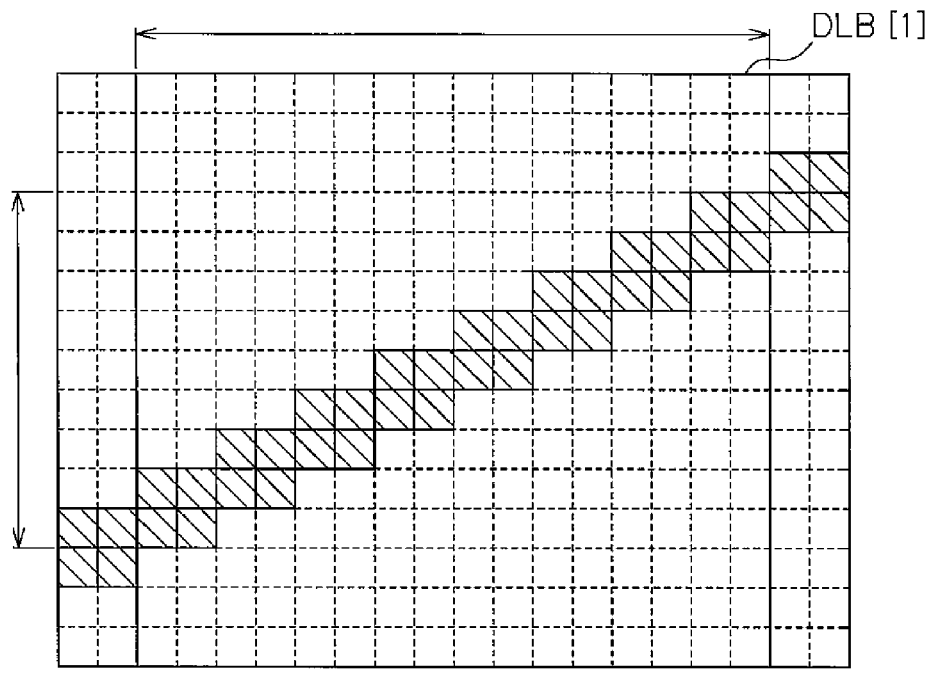
FIGS. 27A and 27B illustrate the number of necessary lines in image data pieces.
Figure 27B:
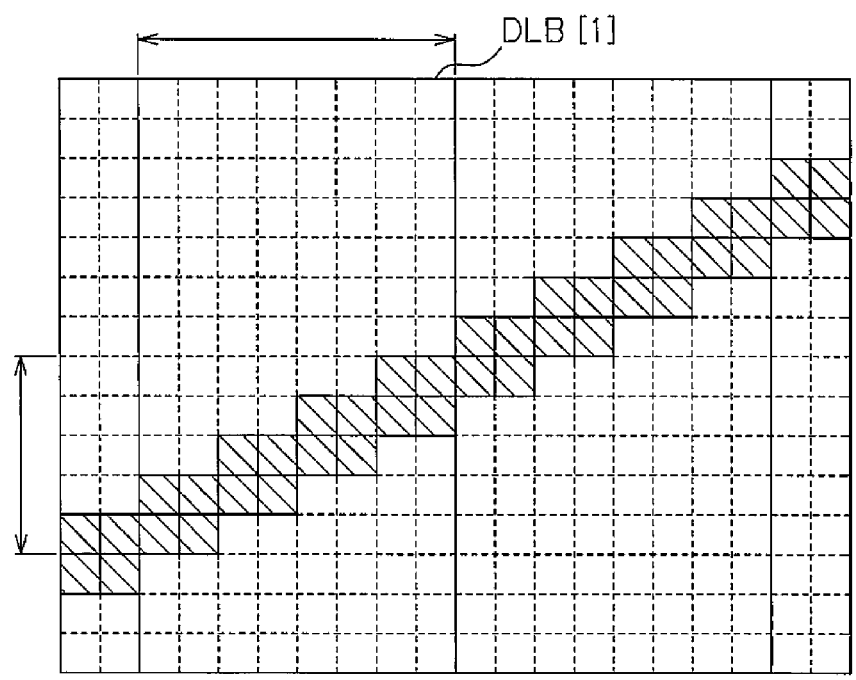

FIGS. 27A and 27B illustrate pixels necessary for generating output pixels in one line in image data pieces transferred in the above manner. In FIGS. 27A and 27B, ranges indicated by horizontal arrows represent pixels that are read from the memory 42 through a single access. Ranges indicated by vertical arrows represent pixels necessary for the vertical distortion correction processing with respect to image data pieces stored in the delay line buffers. As such, in the case of the frame sequential format (luma information pieces Y), it is necessary to store pixels corresponding to nine lines into the delay line buffer DLB [1] for the vertical distortion correction processing. In contrast, in the case of the dot sequential format, it is sufficient to store pixels corresponding to five lines into the delay line buffer DLB [1] for the vertical distortion correction processing. That is to say, in the case of the dot sequential format, the storage capacity of the delay line buffer DLB [1] that stores image data pieces can be reduced compared to the case of the frame sequential format. Luma information pieces Y and color difference information pieces Cb, Cr are stored in the delay line buffer DLB [1]. Therefore, information pieces of output pixels corresponding to the information pieces Y, Cb, Cr can be generated based on data pieces transferred through a single access.

The size (number of pixels) M of each grid block in the x-axis direction (horizontal direction) and the size (number of pixels) N of each grid block in the y-axis direction (vertical direction) are not limited to having the same value (M=N=64). The number of pixels M and the number of pixels N may have different values.

In the second embodiment, the horizontal distortion correction unit 101a may store processed image data pieces into the memory 42, and the vertical distortion correction unit 102 may apply the vertical distortion correction processing to image data pieces read from the memory 42. In this case, it is sufficient for the vertical distortion correction unit 102 to read image data pieces stored in the memory 42 in raster order, that is to say, the order in which the horizontal distortion correction unit 101a has written the image data pieces into the memory 42. This makes it possible to read the image data pieces without executing complicated processing.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although embodiments of the present invention have been described in detail, it should be understood that various changes, substitutions, and alterations could be made hereto without departing from the spirit and scope of the invention.

What is claimed is:

1. An image processing device for use with a memory, the device comprising:
    a first distortion correction unit that generates one first output pixel based on two input pixels that are adjacent in a first direction out of a plurality of input pixels included in image data pieces of a captured frame; and
    a second distortion correction unit that generates one second output pixel based on two first output pixels that are adjacent in a second direction different from the first direction, and stores the second output pixel into the memory,
    wherein the second distortion correction unit
        divides an image of the frame into a plurality of grid blocks, and generates input coordinates and an interpolation coefficient corresponding to a coordinate value of the second output pixel based on grid block coordinates of a plurality of vertexes of the grid blocks,
        stores a plurality of division lines into a storage unit, the plurality of division lines having a size corresponding to a transfer amount for a single access to the memory, including a plurality of first output pixels that are consecutive in the first direction, and being based on coordinate values of the plurality of first output pixels corresponding to a plurality of second output pixels having a size corresponding to the transfer amount for the single access,
        successively reads two first output pixels adjacent in the second direction from the storage unit based on the input coordinates, which correspond to coordinate values of the plurality of second output pixels, and
        generates the one second output pixel by applying linear interpolation processing to the read two first output pixels based on the interpolation coefficient.

2. The image processing device according to claim 1, further comprising:
    a plurality of delay line buffers that store a plurality of division lines;
    an input coordinate generation unit that generates coordinate values of first output pixels;
    an input coordinate setting unit that stores grid block coordinates, outputs first grid block coordinates corresponding to the coordinate values generated by the input coordinate generation unit, and outputs second grid block coordinates corresponding to index values and output line numbers of the delay line buffers that output first output pixels based on grid block coordinates;
    a first coordinate calculation unit that calculates a range of first output pixels that are necessary in accordance with coordinate values of second output pixels based on first grid block coordinates;
    an enable signal generation unit that generates an enable signal based on the range of first output pixels calculated by the first coordinate calculation unit and on the coordinate values of the first output pixels generated by the input coordinate generation unit;
    an output coordinate generation unit that generates coordinate values of first output pixels output from the plurality of delay line buffers based on the index values and the output line numbers;
    a second coordinate calculation unit that generates a minimum coordinate value and a maximum coordinate value of coordinate values of the plurality of first output pixels in the second direction, and the interpolation coefficient, based on second grid block coordinates and coordinate values of first output pixels;
    a delay line buffer selection unit that reads first output pixels from one delay line buffer that has been selected in accordance with calculation requests output from the plurality of delay line buffers, and outputs the read first output pixels; and
    a linear interpolation unit that generates the second output pixel by applying linear interpolation processing to two first output pixels that have been output from the delay line buffer selection unit based on the interpolation coefficient,
    wherein the plurality of delay line buffers
        store division lines including pixel data pieces corresponding to the coordinate values generated by the input coordinate generation unit based on the generated coordinate values and the enable signal, and
        output the calculation requests based on the number of buffer levels corresponding to the stored division lines and on the minimum coordinate value and the maximum coordinate value generated by the coordinate calculation unit.

3. The image processing device according to claim 2, wherein each of the plurality of delay line buffers include
    a delay line input buffer that stores first output pixels, output the number of buffer levels in accordance with the number of stored division lines, and output first output pixels included in the stored division lines based on a read request and an offset value, and
    a delay line output control unit that outputs the calculation request based on the number of buffer levels and on the minimum coordinate value and the maximum coordinate value generated by the coordinate calculation unit, output the read request to the delay line input buffer in response to a calculation request acceptance supplied from the delay line buffer selection unit, and output the offset value based on input coordinates output from the coordinate calculation unit.

4. The image processing device according to claim 1, wherein the second distortion correction unit includes
    a first correction unit that generates, with respect to first output pixels included in a first area set out of the first output pixels output from the first distortion correction unit, the one second output pixel based on two first output pixels adjacent in the second direction different from the first direction, and store first output pixels that are not included in the first area and the second output pixels into the memory, and a second correction unit that reads the first output pixels stored in the memory, generate the one second output pixel based on the two first output pixels adjacent in the second direction, and store the generated second output pixel into the memory.

5. The image processing device according to claim 4, wherein the first area is set based on the coordinate values of the second output pixels and on the coordinate values of the first output pixels necessary for generating the second output pixels.

6. The image processing device according to claim 1, wherein the first distortion correction unit generates a first input coordinate and a first interpolation coefficient corresponding to the coordinate values of the first output pixels based on the grid block coordinates of the vertexes of the plurality of grid blocks obtained by dividing the image of the frame, and generates the one first output pixel by applying linear interpolation processing to two input pixels corresponding to the first input coordinate based on the first interpolation coefficient.

7. The image processing device according to claim 1, wherein the first distortion correction unit includes
an input coordinate setting unit that stores the grid block coordinates corresponding to the vertexes of the grid blocks obtained by dividing the image of the frame,
an output coordinate generation unit that generates the coordinate values of the first output pixels,
a coordinate calculation unit that calculates first coordinate values in a pre-correction image corresponding to the coordinate values of the first output pixels based on the grid block coordinates, output input coordinates corresponding to integer portions of the first coordinate values, and output an interpolation coefficient corresponding to decimal portions of the first coordinate values,
a write unit that stores, into a storage unit, first input pixels corresponding to first output pixels, out of first input pixels in the image data pieces, based on the input coordinates,
a read unit that reads and outputs the two input pixels stored in the storage unit based on the input coordinates, and
a linear interpolation unit that generates the one first output pixel by applying interpolation processing to the two input pixels output from the read unit based on the interpolation coefficient.

8. The image processing device according to claim 7, wherein
the coordinate calculation unit calculates a first range values of coordinate values of first output pixels necessary for generating second output pixels that are consecutive in the second direction based on the coordinate values of the first output pixels, and
the first distortion correction unit includes
a buffer that stores the plurality of first output pixels having a size corresponding to the transfer amount for the single access to the memory, and
a transfer control unit that determines whether each first output pixel held in the buffer is effective or ineffective based on the first range values, and if effective first output pixels are held in the buffer, store the plurality of first output pixels held in the buffer into a corresponding area in the memory.

9. The image processing device according to claim 1, wherein the second distortion correction unit includes
an input coordinate setting unit that stores the grid block coordinates corresponding to the vertexes of the grid blocks obtained by dividing the image of the frame,
an output coordinate generation unit that generates coordinate values of the second output pixels,
a coordinate calculation unit that calculates second coordinate values of first output pixels corresponding to coordinate values of the second output pixels based on the grid block coordinates and on coordinate values of the second output pixels, output second input coordinates corresponding to integer portions of the second coordinate values, output a second interpolation coefficient corresponding to decimal portions of the second coordinate values, and output second range values of coordinate values of first output pixels necessary for generating the second output pixels that are consecutive in the second direction,
a transfer control unit that reads first output pixels corresponding to the second range values from the memory into an input buffer,
an internal buffer that stores a plurality of division lines stored in the input buffer,
a line selector that selects two of the division lines in the internal buffer in accordance with the second input coordinates, and output one first output pixel from each of the selected two division lines, and
a linear interpolation unit that generates the one second output pixel by applying linear interpolation processing to the two first output pixels output from the line selector based on the second interpolation coefficient.

10. An image capture device comprising:
an image capture optical system;
an image sensor that generates image data corresponding to light that has passed through the image capture optical system; and
an image processing device that corrects the image data and stores the corrected image data into a memory, the image processing device including
a first distortion correction unit that generates one first output pixel based on two input pixels that are adjacent in a first direction out of a plurality of input pixels included in image data pieces of a captured frame; and
a second distortion correction unit that generates one second output pixel based on two first output pixels that are adjacent in a second direction different from the first direction, and stores the second output pixel into the memory,
wherein the second distortion correction unit
divides an image of the frame into a plurality of grid blocks, and generates input coordinates and an interpolation coefficient corresponding to a coordinate value of the second output pixel based on grid block coordinates of a plurality of vertexes of the grid blocks,
stores a plurality of division lines into a storage unit, the plurality of division lines having a size corresponding to a transfer amount for a single access to the memory, including a plurality of first output pixels that are consecutive in the first direction, and being based on coordinate values of the plurality of first output pixels corresponding to a plurality of second output pixels having a size corresponding to the transfer amount for the single access,
successively reads two first output pixels adjacent in the second direction from the storage unit based on the input coordinates, which correspond to coordinate values of the plurality of second output pixels, and generates the one second output pixel by applying linear interpolation processing to the read two first output pixels based on the interpolation coefficient.

* * * * *